(12) United States Patent
Volpe et al.

(10) Patent No.: US 9,576,295 B2
(45) Date of Patent: Feb. 21, 2017

(54) ADJUSTING A PROCESS FOR VISIT DETECTION BASED ON LOCATION DATA

(75) Inventors: Andrew Volpe, Boston, MA (US); Eric H. Weiss, Somerville, MA (US); Thaddeus R. F. Fulford-Jones, Somerville, MA (US)

(73) Assignee: Service Management Group, Inc., Kansas City, MO (US)

( * ) Notice: Subject to any disclaimer, the term of this patent is extended or adjusted under 35 U.S.C. 154(b) by 292 days.

(21) Appl. No.: 13/535,150

(22) Filed: Jun. 27, 2012

(65) Prior Publication Data

US 2012/0330722 A1 Dec. 27, 2012

Related U.S. Application Data

(60) Provisional application No. 61/501,581, filed on Jun. 27, 2011.

(51) Int. Cl.
*G06Q 30/02* (2012.01)

(52) U.S. Cl.
CPC ...... *G06Q 30/0201* (2013.01); *G06Q 30/0202* (2013.01); *G06Q 30/0207* (2013.01)

(58) Field of Classification Search
CPC ........ H04W 4/023; H04W 4/021; H04W 4/02; H04W 4/025; G06Q 30/0205; G06Q 30/0201; G06Q 30/0261; G06Q 30/0261
See application file for complete search history.

(56) References Cited

U.S. PATENT DOCUMENTS

| 5,557,524 A | 9/1996 | Maki |
| 6,098,048 A | 8/2000 | Dashefsky et al. |
| 6,509,830 B1 | 1/2003 | Elliott |
| (Continued) | | |

FOREIGN PATENT DOCUMENTS

| JP | 2003-196456 A | 7/2003 |
| JP | 2005-275786 A | 10/2005 |
| KR | 10-2011-0069943 A | 6/2011 |

OTHER PUBLICATIONS

Business Wire press release. "uSamp Adding Mobile Surveying to Its Next-Generation Platform, Delivering Access to Millions of Smartphone Users on the Go," http://www.businesswire.com/news/home/20100825005047/en , 3 pages, Aug. 25, 2010.
(Continued)

*Primary Examiner* — Deirdre Hatcher
(74) *Attorney, Agent, or Firm* — Wolf, Greenfield & Sacks, P.C.

(57) ABSTRACT

A method and system for adjusting a process for identifying settings visited by a consumer based at least in part on electronically-derived consumer location data. A method and system are provided for gathering location data for consumers and identifying points of interest (POIs) visited by the consumers based on the location data. Based on a comparison of settings identified by a process to settings that are identified in data collected from external data sources, the system may determine whether to adjust the visit detection process. The system may adjust the visit detection process by adjusting a way in which settings are defined in a data set, by adding or removing settings from a data set, and/or by changing a manner in which the visit detection process determines whether a location corresponds to a setting in the data set.

20 Claims, 11 Drawing Sheets

::::

(56) References Cited

U.S. PATENT DOCUMENTS

| | | | |
|---|---|---|---|
| 6,609,064 B1 | 8/2003 | Dean | |
| 6,647,269 B2 | 11/2003 | Hendrey et al. | |
| 6,970,131 B2 | 11/2005 | Percy et al. | |
| 6,975,941 B1 | 12/2005 | Lau et al. | |
| 6,999,987 B1 | 2/2006 | Billingsley et al. | |
| 7,176,834 B2 | 2/2007 | Percy et al. | |
| 7,215,280 B1 | 5/2007 | Percy et al. | |
| 7,240,834 B2 | 7/2007 | Kato et al. | |
| 7,305,245 B2 | 12/2007 | Alizadeh-Shabdiz et al. | |
| 7,408,502 B2 | 8/2008 | Percy et al. | |
| 7,515,578 B2 | 4/2009 | Alizadeh-Shabdiz et al. | |
| 7,586,439 B2 | 9/2009 | Percy et al. | |
| 7,589,628 B1 | 9/2009 | Brady, Jr. | |
| 7,769,633 B2 | 8/2010 | Jokinen et al. | |
| 7,822,426 B1 * | 10/2010 | Wuersch | G01C 21/20 342/450 |
| 7,930,204 B1 | 4/2011 | Sharma et al. | |
| 8,150,967 B2 | 4/2012 | King et al. | |
| 8,200,247 B1 | 6/2012 | Starenky et al. | |
| 8,271,322 B2 | 9/2012 | Ariyibi | |
| 8,396,468 B1 | 3/2013 | Krinsky et al. | |
| 8,509,761 B2 | 8/2013 | Krinsky et al. | |
| 2002/0082921 A1 | 6/2002 | Rankin | |
| 2002/0111154 A1 | 8/2002 | Eldering et al. | |
| 2002/0111172 A1 | 8/2002 | DeWolf et al. | |
| 2002/0167408 A1 | 11/2002 | Trajkovic et al. | |
| 2003/0146871 A1 * | 8/2003 | Karr et al. | 342/457 |
| 2004/0034570 A1 | 2/2004 | Davis | |
| 2004/0093265 A1 | 5/2004 | Ramchandani et al. | |
| 2004/0093268 A1 | 5/2004 | Ramchandani et al. | |
| 2005/0059412 A1 | 3/2005 | Hosokawa | |
| 2005/0243784 A1 | 11/2005 | Fitzgerald et al. | |
| 2006/0111961 A1 | 5/2006 | McQuivey | |
| 2006/0174329 A1 | 8/2006 | Dublish | |
| 2007/0185768 A1 | 8/2007 | Vengroff et al. | |
| 2007/0186007 A1 * | 8/2007 | Field et al. | 709/233 |
| 2008/0042836 A1 | 2/2008 | Christopher | |
| 2008/0070588 A1 | 3/2008 | Morin | |
| 2008/0125959 A1 | 5/2008 | Doherty et al. | |
| 2008/0158053 A1 * | 7/2008 | Watanabe | 342/357.15 |
| 2008/0246657 A1 | 10/2008 | Percy et al. | |
| 2008/0248815 A1 | 10/2008 | Busch | |
| 2009/0005987 A1 * | 1/2009 | Vengroff et al. | 701/300 |
| 2009/0064014 A1 | 3/2009 | Nelson et al. | |
| 2009/0064173 A1 | 3/2009 | Goldspink et al. | |
| 2009/0112683 A1 | 4/2009 | Hamilton et al. | |
| 2009/0132469 A1 * | 5/2009 | White et al. | 707/2 |
| 2009/0160703 A1 * | 6/2009 | Duffett-Smith et al. | 342/357.04 |
| 2009/0171939 A1 * | 7/2009 | Athsani et al. | 707/5 |
| 2009/0199107 A1 | 8/2009 | Lewis et al. | |
| 2009/0248288 A1 | 10/2009 | Bell et al. | |
| 2009/0298480 A1 | 12/2009 | Khambete et al. | |
| 2009/0298514 A1 | 12/2009 | Ullah | |
| 2010/0004997 A1 | 1/2010 | Mehta et al. | |
| 2010/0023401 A1 | 1/2010 | Ariyibi | |
| 2010/0076820 A1 | 3/2010 | Davis | |
| 2010/0131443 A1 | 5/2010 | Agarwal et al. | |
| 2010/0191746 A1 | 7/2010 | Wang et al. | |
| 2010/0262449 A1 | 10/2010 | Monteforte et al. | |
| 2010/0262462 A1 | 10/2010 | Tryfon | |
| 2010/0332315 A1 | 12/2010 | Kamar et al. | |
| 2011/0022424 A1 | 1/2011 | VonDerheide | |
| 2011/0029370 A1 | 2/2011 | Roeding et al. | |
| 2011/0106721 A1 | 5/2011 | Nickerson | |
| 2012/0054016 A1 | 3/2012 | Todd et al. | |
| 2012/0066026 A1 | 3/2012 | Dusig et al. | |
| 2012/0072263 A1 | 3/2012 | Dusig et al. | |
| 2012/0072288 A1 | 3/2012 | Dusig | |
| 2012/0232953 A1 | 9/2012 | Custer | |
| 2012/0239479 A1 * | 9/2012 | Amaro et al. | 705/14.23 |
| 2013/0018701 A1 | 1/2013 | Dusig et al. | |
| 2013/0225202 A1 * | 8/2013 | Shim | G06F 17/30424 455/456.3 |
| 2013/0226857 A1 * | 8/2013 | Shim | G06N 5/04 706/52 |
| 2013/0345957 A1 * | 12/2013 | Yang | G06N 5/02 701/300 |

OTHER PUBLICATIONS

International Search Report and Written Opinion for International Application No. PCT/US2012/044410 mailed Mar. 4, 3013, 13 pages.
U.S. Appl. No. 12/910,280, filed Oct. 22, 2010, Weiss et al.
U.S. Appl. No. 12/910,311, filed Oct. 22, 2010, Weiss et al.
U.S. Appl. No. 12/910,372, filed Oct. 22, 2010, Weiss et al.
U.S. Appl. No. 13/472,294, filed May 15, 2012, Weiss et al.
U.S. Appl. No. 13/472,320, filed May 15, 2012, Weiss et al.
U.S. Appl. No. 13/535,108, filed Jun. 27, 2012, Volpe et al.
U.S. Appl. No. 13/535,130, filed Jun. 27, 2012, Volpe et al.
"Field Agent," available at: www.fieldagent.net, retrieved Aug. 22, 2012.
"Gigwalk, Instantly mobilize people to do work anywhere," available at: www.gigwalk.com, retrieved Aug. 22, 2012.
"Shadow Cities—Magical location MMORPG for iPhone, iPod," available at: www.shadowcities.com, retrieved Aug. 22, 2012.
"SCVNGR—Wikipedia, the free encyclopedia," available at: http://en.wikipedia.org/wiki/SCVNGR, retrieved Aug. 22, 2012.
"Foursquare—Wikipedia, the free encyclopedia," available at: http://en.wikipedia.org/wiki/Foursquare, retrieved Aug. 22, 2012.
Kelly, "Gigwalk Adds Microsoft to Its List of Brands, Offers 110K Paying 'gigs' (Infographic)," available at: http://www.nytimes.com/external/venturebeat/2011/07/19/19venturebeat-gigwalk-adds-microsoft-to-its-list-of-brands-12055.html?partner=rss&emc=rss, The New York Times, Published Jul. 19, 2011, retrieved Aug. 22, 2012.
Finney, "iPhone app helps users make some extra cash," available at: http://abclocal.go.com/kgo/story?section=news/7_on_your_side&id=8441998, Published Nov. 22, 2011, retrieved Aug. 22, 2012.
Unni et al., "Location-Based Services: Models for Strategy Development in M-Commerce" 2003.
International Preliminary Report on Patentability and Written Opinion for PCT/US2012/044410, mailed Jan. 16, 2014.
U.S. Appl. No. 14/043,717, filed Oct. 1, 2013, Weiss et al.
U.S. Appl. No. 14/043,804, filed Oct. 1, 2013, Weiss et al.
U.S. Appl. No. 14/043,811, filed Oct. 1, 2011, Weiss et al.
U.S. Appl. No. 14/043,816, filed Oct. 1, 2010, Weiss et al.

* cited by examiner

ADJUSTING A PROCESS FOR VISIT DETECTION BASED ON LOCATION DATA

CROSS-REFERENCE TO RELATED APPLICATIONS

This application claims priority under 35 U.S.C. §119(e) to U.S. Provisional Patent Application Ser. No. 61/501,581, filed on Jun. 27, 2011, and titled "Timing collection of consumer input based on location data," which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Field of the Invention

Embodiments of the invention relate to systems for analyzing and gathering information on and/or from consumers. More specifically, embodiments of the present invention are directed to techniques for collecting relevant and timely data from and about consumers to make inferences and predictions in combination with electronically-captured location data.

Discussion of Related Art

Businesses can often benefit from knowledge about the behavior of their customers or prospective customers. For example, a business may offer certain products or undertake a marketing strategy based on its beliefs regarding who its customers are. If these beliefs are inaccurate, though, the business' efforts may be misdirected and the business may fail to maintain old customers or attract new customers.

Efforts have been previously made at collecting information about consumers who may be customers and prospective customers of a business. In some such techniques, a researcher may ask consumers about their identities, preferences or behaviors using direct questioning. These questions may be designed to solicit particular information about consumers, such as regions in which a business' customers live, a socioeconomic grouping of consumers, how often the consumers shop at the business, factors influencing purchasing decisions, and their consuming preferences. Written or oral questionnaires, one-on-one interviews, brief point-of-sale questions at the business, focus groups, and telephone or online surveys are examples of ways in which information about consumers can be collected using direct questioning.

This same information may be voluntarily provided by consumers when the consumers register for a service. This may be the case when consumers are registering for discount programs or for services offered commercially by the business. Thus, when a consumer subscribes to services offered by the business, direct questions may solicit information that may be used to acquire information about the individual consumer and for the general class of that business' consumers. The acquired information may then be analyzed to determine information useful to the business.

SUMMARY

In one embodiment, there is provided a method of operating a consumer analytics system in which information about consumers is generated at least in part based on applying a visit detection process to location data relating to one or more consumers, to identified settings visited by the one or more consumers. The method comprises receiving input provided by a consumer identifying a setting visited by the consumer at a time, obtaining information identifying a physical location of the consumer at the time, and adjusting, using at least one processor and based at least in part on the input provided by the consumer and the physical location of the consumer, the visit detection process for identifying settings visited by the plurality of consumers.

In another embodiment, there is provided at least one storage medium having encoded thereon executable instructions that, when executed by the at least one processor, cause the at least one processor to carry out a method of operating a consumer analytics system in which information about consumers is generated at least in part based on applying a visit detection process to location data relating to one or more consumers, to identified settings visited by the one or more consumers. The method comprises receiving input provided by a consumer identifying a setting visited by the consumer at a time, obtaining information identifying a physical location of the consumer at the time, and adjusting, using at least one processor and based at least in part on the input provided by the consumer and the physical location of the consumer, the visit detection process for identifying settings visited by the plurality of consumers.

In a further embodiment, there is provided an apparatus comprising at least one processor and at least one storage medium having encoded thereon executable instructions that, when executed by the at least one processor, cause the at least one processor to carry out a method of operating a consumer analytics system in which information about consumers is generated at least in part based on applying a visit detection process to location data relating to one or more consumers, to identified settings visited by the one or more consumers. The method comprises receiving input provided by a consumer identifying a setting visited by the consumer at a time, obtaining information identifying a physical location of the consumer at the time, and adjusting, using at least one processor and based at least in part on the input provided by the consumer and the physical location of the consumer, the visit detection process for identifying settings visited by the plurality of consumers.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
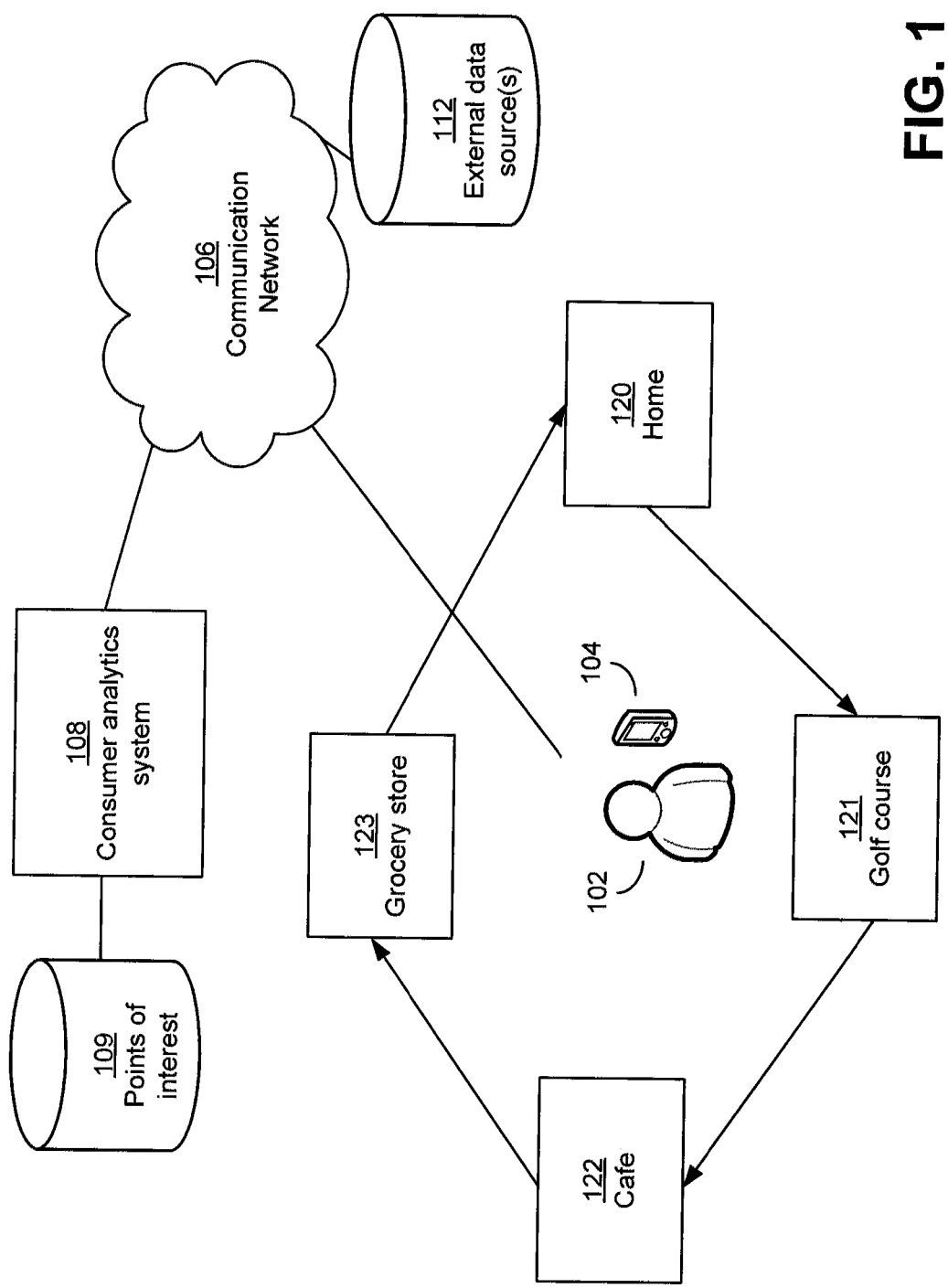
FIG. 1 illustrates one exemplary environment in which embodiments may operate.

The Applicants have recognized and appreciated various improvements that may be made in a consumer analytics system from using, in combination, data revealing behaviors of consumers that are related to or inferred from location of the consumers, and other types of information. Such location-based behaviors and other types of information may be correlated in time such that the data relating to the behavior and the other types of information may be contemporaneous.

In one aspect, Applicants have recognized and appreciated the advantages of detecting consumers' behaviors contemporaneously with the consumers engaging in the behaviors and collecting information in response to detecting those behaviors. More particularly, Applicants have recognized and appreciated the advantages of a consumer analytics system that may infer and/or predict consumers' behaviors from evaluating physical locations through which the consumers passed. Such a system may trigger collection of information regarding commercial activity based on those behaviors.

Accordingly, described herein are techniques for operating a consumer analytics system to obtain location data for consumers and produce predictions and/or inferences of characteristics of consumers, which may include predictions and/or inferences of behavior characteristics of consumers relating to behaviors of the consumers. The consumer analytics system may be configured to take one or more actions when one or more conditions for the actions are satisfied. At least some of the conditions may relate to characteristics of consumers. When characteristics of consumers predicted and/or inferred by the consumer analytics system satisfy the condition(s) for an action, the consumer analytics system may take the action. In some embodiments, the consumer analytics system may determine the characteristics of the consumers and take an action contemporaneously with the consumers being present at locations, indicated by the location data, to exhibit consumer behaviors of interest.

In one illustrative example of a way in which techniques described herein may be used, a consumer analytics system may evaluate physical locations through which a consumer passed and determine that the consumer visited a particular retail store or interacted with some other commercial entity that is a subject of consumer analysis. In response, the system may prompt the consumer to provide answers in response to survey questions, where the survey questions may include questions relating to the retail store visited by the consumer or other interaction with the commercial entity. In the example of a retail store, the consumer analytics system may prompt the consumer to provide the answer contemporaneously with the consumer's visit to the retail store, such as while the consumer is still visiting the retail store or has just left the store. As another illustrative example, a consumer analytics system may evaluate physical locations through which a consumer passed and determine that the consumer visited a retail store that the consumer does not normally visit, demonstrating a deviation from a pattern of behavior previously identified for the consumer. In response to detecting the deviation, the consumer analytics system may acquire social networking data for the consumer. The data may then be reviewed for data, contemporaneous with the consumer's deviation from the pattern. Such social networking data, when analyzed in combination with information about the behavior of deviating may indicate what may have caused the detected consumer behavior.

In embodiments in which an action to be taken by a consumer analytics system in response to determining characteristics, including behaviors, of consumers includes collecting information, the consumer analytics system may collect any suitable information. The information may, for example, include information relating to commercial activity. The information related to a commercial activity may include information related, for example, to a commercial entity, a product, and/or a service, including such commercial activity as an advertisement or product display. Information regarding commercial activity may include information regarding commercial activity of a consumer, such as commercial entities visited, products and/or services purchased, and/or preferences of the consumer with respect to commercial entities, products, and/or services. Information regarding commercial activity may additionally or alternatively include information regarding commercial activity of a consumer, which may include products and/or services offered by the commercial entity, marketing efforts of the commercial entity, and/or monetary transactions in which the commercial entity engaged. A commercial entity may be any suitable entity that may engage in commerce with consumers, including an entity that may provide products and/or services directly to a consumer, such as a retailer, or that may distribute products and/or services that may be purchased by a consumer, such as a manufacturer, vendor, or wholesaler.

In embodiments in which a consumer analytics engine is configured to collect information in response to determining characteristics of consumers, the consumer analytics system may be configured to collect information in any suitable manner. The consumer analytics system may be configured to collect information from a consumer and/or from one or more data sources external to the consumer analytics system. The consumer analytics system may collect information from a consumer by soliciting the information from the consumer. To solicit information, the consumer analytics system may send one or more messages to consumers describing the solicited information and/or describing tasks that the consumers are requested to perform to obtain the solicited information. The task to be performed by the consumer may include interacting with a commercial entity, such as by visiting a commercial entity, visiting a department or section of a commercial entity, or speaking with staff of the commercial entity. The task may additionally or alternatively include providing opinions or preferences of the consumer regarding commercial activity. The consumer analytics system may collect information from one or more data sources external to the consumer analytics system in any manner. External data sources may store information regarding commercial activity and/or regarding one or more consumers, one or more commercial entities, or an environment of the consumer(s) or the commercial entity(ies).

Information regarding a consumer may be related to a consumer in any suitable way. The information regarding a consumer may include information relating to an identity, behavior, or preferences of a consumer, and/or information relating to commercial activity performed by or experienced by the consumer or with which the consumer interacted. In some cases, the information relating to a consumer may include information created by a consumer. Information created by a consumer and stored in an external data store may include social networking data maintained by a social networking service. Information regarding a commercial entity may be related to the commercial entity in any suitable way. The information regarding the commercial entity may be information maintained by a commercial entity regarding commercial activity of the commercial entity, including monetary transactions engaged in by the commercial entity, information on loyalty programs of the commercial entity, and/or information on marketing information for the commercial entity. Information regarding an environment of a consumer and/or a commercial entity may include any suitable environmental data, including information regarding environmental conditions that may impact commercial activities, such as by impacting the likelihood of consumers and commercial entities engaging in monetary transactions. For example, information regarding weather conditions and/or information regarding gas prices may be collected by the consumer analytics system.

A consumer analytics system operating according to techniques described herein is not limited to taking actions that include collecting information. A consumer analytics system may, in response to determining that characteristics of consumers satisfy conditions for an action, take an action that includes storing information in one or more external data stores. To store information in an external data store, the consumer analytics system may transmit the data to a computing device to be stored in the external data store. The consumer analytics system may store any suitable information in an external data store, including information regarding commercial activity, including commercial activity of a consumer and/or a commercial entity.

Thus, it should be appreciated that a consumer analytics system operating according to techniques described herein may take any suitable action in response to determining, based at least in part on location data for consumers, that one or more characteristics of one or more consumers satisfy one or more conditions for the action. It should also be appreciated that the condition(s) for an action may relate to any suitable characteristics of consumers, including characteristics that may be determined from evaluating location data for the consumers. Characteristics of consumers that may be determined from location data include behavior characteristics, identity characteristics, and preference characteristics. Behavior characteristics may relate to behaviors of consumers, including behaviors that relate to commercial activities in which the consumers engage. Commercial activities of the consumer for which behavior characteristics may be determined may include activities in which a monetary transaction takes place or could take place. Behavior characteristics of a consumer may identify or describe an activity in any suitable way, including by identifying/describing a nature of an activity, a frequency in which a consumer engages in the activity, or a context in which the consumer engages in the activity. Further details regarding behavior characteristics, identity characteristics, and preference characteristics are provided below.

A consumer analytics system may take an action regarding a consumer (such as soliciting information from the consumer or acquiring information regarding commercial activity of the consumer) in response to predicting and/or inferring one or more characteristics of that consumer, or in response to predicting and/or inferring one or more characteristics of any other consumer(s), including for one or more groups of consumers. When an action is associated with multiple conditions that relate to multiple consumer characteristics, each of the multiple characteristics satisfying the conditions for the action may be predicted and/or inferred at any suitable time relative to one another, including at the same time or at different times.

Additionally, the characteristic(s) of one or more consumers that satisfy the condition(s) for an action may be determined contemporaneously with the predicted and/or inferred presence of the consumer(s) at locations identified by location data from which the characteristics were determined. The characteristics may be determined contemporaneously with the consumers' presence because the characteristics are determined while the consumers are still present at the location, because the consumers are close to arriving at the location, or because the consumers have recently left the location. In some embodiments, the characteristics may be determined contemporaneously with the predicted and/or inferred presence of the consumers at the locations because the characteristics are determined before the consumer exhibits different characteristics by moving to one or more different locations from which a different characteristic is predicted and/or inferred. For example, when a behavior of the consumer satisfying a condition of the action is predicted and/or inferred from the consumer's presence at a location, the characteristics may be determined before the consumer moves to a different location from which a different behavior of the consumer is predicted and/or inferred. When multiple different characteristics of consumers are predicted and/or inferred at different times to satisfy conditions for an action, any or all of the characteristics may be predicted and/or inferred contemporaneously with the consumer's predicted and/or inferred presence at the location. The consumer analytics system may also take the action associated with the condition(s) contemporaneously with the predicted and/or inferred presence of a consumer at a location from which the characteristic(s) satisfying the condition(s) for the action were determined. When multiple characteristics satisfying conditions for an action are determined at different times, the action may be taken contemporaneously with a consumer's presence at a location from which was determined the characteristic of the consumer that was determined last in time.

Location data that may be analyzed by a consumer analytics system to determine characteristics of consumers may be in any suitable form. Location data may be in a form electronically derived through measurements of location performed by a portable computing device. Location data that is electronically-derived through measurement may identify a physical location of the consumer, including a geographic location of the consumer. Location data identifying a measured physical location of the consumer may be derived in any suitable manner, including using a satellite navigation system and/or triangulation technique. Additionally or alternatively, location data may include information indicating a setting visited by a consumer, such as information collected from a consumer and/or information collected from an external data source. Information indicating a setting visited by a consumer may include information provided by a consumer to a social networking service, or any other suitable information. Thus, a consumer analytics system operating according to techniques described herein may be configured to take an action in response to determining that one or more characteristics of one or more consumers satisfy one or more conditions for the action to be taken.

For systems that have access to measured location data identifying a current location of consumers, behaviors, or other consumer characteristics inferred from that location data may be correlated in time with other types of information by collecting that information contemporaneous with detecting the characteristic from analyzing the location data in near real time. However, in other system, that analysis may be performed on previously recorded data and other techniques may be used to synchronize other types of information with location-based characteristics.

In some embodiments, as part of analyzing location data for consumers, a consumer analytics system may perform a visit detection process. The visit detection process may identify, from location data for consumers, settings visited by the consumers. The visit detection process may be configured to recognize a set of settings with which the visit detection process is configured, based on definitions for the settings. In some embodiments, a consumer analytics system may be configured to adjust the visit detection process based on information collected by the consumer analytics system. The information may have been collected by the consumer analytics system when conditions for an action to collect information were met by characteristics of consumers. When information is collected by the consumer analytics system, the information may identify a setting visited by a consumer. When the information identifies a setting visited by the consumer, the identified setting may be used to adjust the visit detection process. For example, the setting may be compared to a setting identified by the visit detection process from analyzing location data to determine whether there is a match. When the settings match, the visit detection process may be adjusted to reflect that the visit detection process was correct, such as by adjusting a definition of the setting based on the location data that was correctly interpreted as corresponding to the setting. If, however, the settings do not match or if the visit detection process was unable to identify a setting from location data, the visit detection process may be adjusted to attempt to improve the reliability of the visit detection process and the likelihood that the visit detection process will correctly interpret a location as corresponding to a setting. Adjusting the visit detection process may include adjusting a definition of one or more settings, adjusting the set of settings, or adjusting parameters of the visit detection process.

Examples of ways in which techniques described herein may be implemented are described below. It should be appreciated, however, that embodiments are not limited to operating in accordance with any of these examples.

Illustrative Context

FIG. 1 illustrates an exemplary environment in which some embodiments may operate to detect location data for one or more consumers and, by analyzing that location data, determine characteristics of those consumers. The example of FIG. 1 is described in connection with one consumer, but embodiments may operate with any number of consumers.

In the environment of FIG. 1, a consumer 102 changes location while going to work, going home, going to school, running errands, or moving from any other place to place. In the specific example of FIG. 1, the consumer 102 visits a golf course 121, cafe 122, and grocery store 123 during a day. The consumer analytics system 108 monitors movements of the consumer 102 and, by detecting and analyzing locations the consumer 102 visits, produces inferences and predictions regarding characteristics of the consumer, which may include inferences and/or predictions of behavior characteristics relating to behaviors of the consumer.

Embodiments may monitor movements of the consumer 102 in any suitable manner. In some embodiments, location data for a consumer may be collected for the consumer using techniques described in U.S. patent application Ser. No. 12/910,280, filed on Oct. 22, 2010, and titled "Electronically capturing consumer location data for analyzing consumer behavior" ("the '280 application"). The '280 application is incorporated herein by reference in its entirety for all purposes and at least for its disclosure of collecting and analyzing location data for consumers to predict and/or infer characteristics of the consumers.

In some embodiments, the consumer 102 is associated with a device 104 that can be used to obtain location information for the consumer 102 as the consumer 102 moves. The consumer 102 may move with the device 104, as the consumer 102 may carry the device 104 or the device 104 may be embedded in a car, piece of clothing, or baggage carried by the consumer 102. In some cases, the device 104 may be useful only in determining a location of the consumer 102, while in other cases the device 104 may have additional functionality. For example, the device 104 may be a mobile telephone with location-identifying capabilities, such as a cellular telephone with a built-in Global Positioning System (GPS) or Assisted GPS (AGPS) receiver that the cellular telephone can use to determine its current location. The device 104 may be able to communicate with a network 106, which may be any suitable communication network, including a wireless wide-area network (WWAN). In cases where the device 104 is a cellular telephone, the network 106 may be or include a cellular network.

The consumer analytics system 108 may obtain location data for a consumer 102 from the device 104. In some cases, the consumer analytics system 108 may request the location information from the network 106 and, in turn, the network 106 may obtain location data from the device 104. In some embodiments, the consumer analytics system 108 may request the location data at varying intervals based on various factors, including the current location of the consumer 102.

The consumer analytics system 108 may analyze the location data to identify settings visited by the consumer, including settings of the set of settings 109, and predict and/or infer characteristics of the consumer 102. Inferring and/or predicting characteristics of the consumer 102 may include inferring and/or predicting behaviors in which the consumer 102 engages, was engaging, or will engage. In some embodiments, when the system 108 infers and/or predicts one or more characteristics of one or more consumers (including the consumer 102), the characteristic(s) of the consumer(s) trigger the system 108 to take one or more actions.

The system 108 may take any suitable action, as embodiments are not limited to taking any particular action. In some embodiments, the action taken by the system 108 may include collecting information regarding commercial activity, including commercial activity of consumers. Commercial activity of a consumer may include information regarding visiting a commercial entity, purchasing a product or a service, and/or preferences of the consumer regarding commercial entities, products, and/or services. Commercial entities, products, or services about which information is obtained may be commercial entities, products, or services to which an inferred or predicted characteristic of the consumer 102 relates. For example, an inferred characteristic may relate to interactions of the consumer 102 with a commercial entity, such as behaviors or preferences of the consumer 102 with respect to the commercial entity. In such a case, the product or service about which information is obtained may be a product or service of the commercial entity. In other cases, the commercial entity, product, or service may not be related to an inferred or predicted characteristic, but may be a product or service for which market research is being conducted. Market research may be conducted to determine characteristics of consumers related to the commercial entity, product, or service, and the market research may include collecting information from or about consumers for which a characteristic has been inferred. When the characteristic is inferred for the consumer 102, then, the system 108 takes the action to obtain information about the product or service.

Embodiments are not limited to taking any particular action in response to inferring or predicting any particular characteristic. As an example of an action that the system 108 may take, in some embodiments, in response to inferring and/or predicting behavior of the consumer 102, the system 108 may solicit information from the consumer regarding commercial activity. To solicit the information, the system 108 may send the consumer 102 an alert or message on the device 104. The message sent to the device 104 may include a request for the consumer 102 to complete a task. The task may include providing information to the system 108, which may include information regarding commercial activity. In some cases, the task included in the message may include answering survey questions provided to the consumer 102. The consumer 102 may, in some embodiments, respond to survey questions using the device 104. Examples of other messages and tasks that may be provided to a consumer 102 by the system 108 are described in greater detail below.

As another example of actions that may be taken by the system 108 in response to inferring or predicting one or more characteristics of one or more consumers, the system 108 may acquire information from at least one data source external to the system 108. The information acquired from the at least one data source may be any suitable information, as embodiments are not limited in this respect. In some cases, the information may include information regarding the consumer 102, regarding an inferred characteristic, and/or regarding a commercial entity or a product or service offered by a commercial entity. For example, in response to inferring a characteristic of the consumer 102, the system 108 may obtain social networking data provided by a consumer to a social networking service or that relates to the consumer 102. The social networking data may be evaluated to determine whether the social networking data indicates information relating to the characteristic and/or to a product or service. For example, the social networking data may include a review of a product or service indicating opinions of the consumer 102 regarding the product or service. Examples of other types of external data sources from which information may be obtained are described in greater detail below.

Examples of ways in which a consumer analytics system may process location data for multiple consumers, determine characteristics of consumers, and take actions based on determined characteristics are described in greater detail below. It should be appreciated that some of the examples below may not be described in connection with the illustrative environment described above in connection with FIG. 1. Embodiments are not limited to operating in any particular environment, including the environment of FIG. 1. Further, it should be appreciated that embodiments are not limited to acting in accordance with any of the examples below. Embodiments may operate in any suitable manner to process location data for consumers related to movements of the consumers in any suitable environment.

Illustrative Techniques

Figure 2:
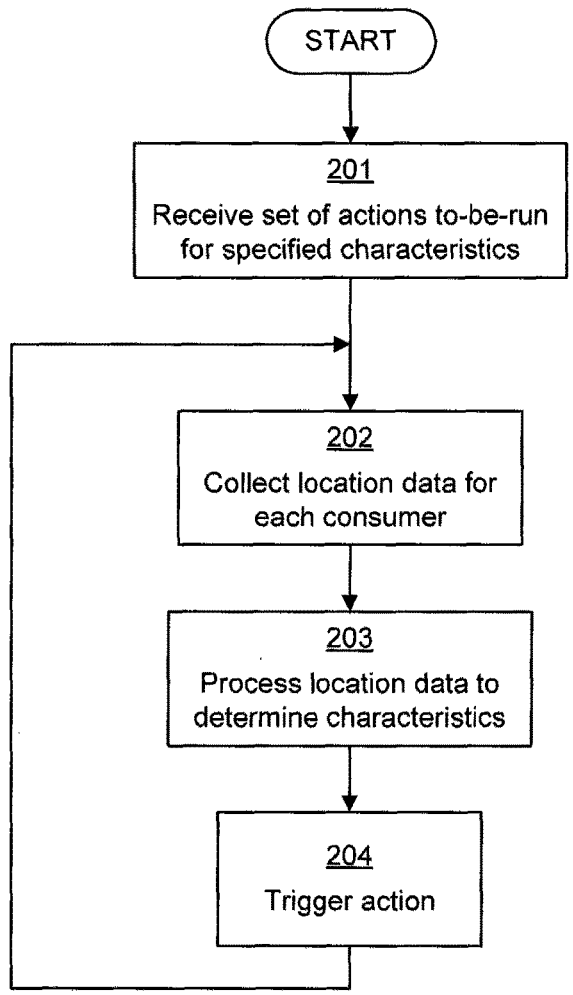
FIG. 2 is a flowchart of an exemplary process for triggering actions that gather information from and/or on consumers.

FIG. 2 illustrates one example of an overall process for collecting relevant and timely data from and about consumers to make inferences and predictions by using electronically-captured location data. The process of FIG. 2 begins in block 201, in which a set of actions to-be-triggered are input. The actions may be specified by any suitable one or more parties, as embodiments are not limited in this respect. In some embodiments, the actions may be specified by an administrator of a consumer analytics system. In other embodiments, the actions may additionally or alternatively be specified by one or more market researchers as part of defining a market research study. In embodiments in which the actions are specified as part of defining a study, the actions specified in block 201 may include actions to be taken by the consumer analytics system to collect information to be analyzed as part of the study. Actions to collect information may include actions to solicit information from one or more consumers and/or acquire information from one or more external data sources. Any suitable party may act as a market researcher in these embodiments, including professional market researchers or laymen doing market research. Additionally, the study may relate to any suitable topic. For example, a market research study may be carried out to determine characteristics of consumers that relate to a setting, of the set of setting 109 of the environment of FIG. 1, based on information about consumers of interest. The setting of the set 109 may be a commercial entity, such as a retail business.

Any suitable information regarding actions to be taken may be specified in block 201. In some embodiments, information describing the action to be taken may be specified. For example, where the action includes requesting that a consumer perform a task, the task may be described.

Any suitable task to be performed by a consumer may be included in an action, as embodiments are not limited in this respect. In some cases, a task may include prompting a consumer to answer survey questions, in which case the survey questions and, optionally, acceptable answers to the questions may be specified in block 201. In other cases, a task may include prompting a consumer to obtain media or scan a Universal Product Code (UPC) barcode or Near Field Communication (NFC) tag, in which case the subject of the desired media or the object desired to be scanned may be specified in block 201. In still other cases, a task may include requesting that a consumer visit a setting and provide information or opinions about the setting, such as providing opinions regarding an arrangement of items in a setting, and the setting and topic of the desired opinion may be specified in block 201.

Additionally, specifying the action in block 201 may include specifying one or more conditions that, when satisfied, will result in the consumer analytics system taking the action. Any suitable conditions may be specified, including conditions related to one or more characteristics of one or more consumers determined from location data. For example, a condition may be satisfied when the consumer analytics system determines, from location data for a consumer, a characteristic of a consumer. A characteristics of a consumer may be a behavior characteristic of a consumer relating to a behavior in which the consumer was engaging when the location data was derived. Such a characteristic may be, for example, that the consumer is a customer of a commercial entity. As another example of a condition, a condition may be satisfied when the consumer analytics system determines a characteristic of a group of consumers. A characteristic of a group of consumers may be a characteristic of the group and not of individual consumers of the group (e.g., an average characteristic for the group) or a characteristic shared by consumers of the group. As another example of a condition, a condition may be satisfied based on an evaluation of a characteristic that describes a behavior. For example, a behavior characteristic may relate to a frequency with which a consumer performs a behavior, such as a frequency with which the consumer visits a retail business. An example of a condition that may be associated with an action is a condition that a behavior characteristic indicate that a frequency of a consumer's visits to a retail business is greater than two visits per month.

In one illustrative example of an action and a condition, an action includes requesting that a consumer respond to survey questions regarding a commercial entity for which market research is being conducted, and a condition for the action is that an analysis of location data for a consumer produces an inference that the consumer is a customer of the commercial entity. This action and condition may be specified in block 201. Subsequently (as discussed below), when location data for a consumer is analyzed and a characteristic indicating that a consumer is a customer of the commercial entity is inferred, the consumer analytics system may prompt that consumer to provide responses to the survey questions. The action taken by the consumer analytics system to prompt the consumer may be taken by the system contemporaneously with the consumer's presence at a location from which the characteristics satisfying the conditions were inferred. As another example, a system may infer from location data that consumers of a group of consumers who frequently shop at one store (or type of store) are visiting a competitor store not frequently visited by consumers of the group. In response to drawing the inference, the system may survey individual consumers who are members of the group to determine a purpose of the consumers' visits to the competitor store. The surveying may be conducted electronically, by transmitting messages to the consumers, and may be performed contemporaneously with the consumer's visit to the competitor store.

In block 202, location data is obtained for multiple consumers. Any suitable location data may be obtained, as embodiments are not limited in this respect. Location data may, in some embodiments, include geographic location data identifying a geographic location that results from a location measurement performed by a computing device using a location identification system like the Global Positioning System (GPS). A geographic location of a consumer may be defined according to a latitude, longitude, altitude, and/or margin of error that identifies the precision of the latitude, longitude, and altitude. Location data may also include time data indicating a time at which the location data for the consumer was obtained. Illustrative examples of location data are discussed below.

The location data may be obtained in any suitable manner. Examples of location data that may be obtained and ways in which location data may be obtained are discussed in detail below and in the '280 application that is incorporated herein by reference. In some embodiments, the location data for a consumer may be obtained in part using an electronic device associated with a consumer. The electronic device may be any suitable portable device that may move along with the consumer. The device may be carried by the consumer or may be integrated into an item associated with the consumer (e.g., integrated into a car, baggage, or clothing). The electronic device may obtain location data or be used in obtaining location data. Location data obtained by the electronic device may be transmitted to a consumer analytics system at any suitable time and in any suitable manner. In some embodiments, the electronic device may continuously or occasionally transmit location data for the consumer to a consumer analytics system without receiving a request for the location data from the system. In other embodiments, the consumer analytics system may occasionally request location data from the electronic device and the electronic device may transmit the location data upon receipt of the request. In still other embodiments, the electronic device may transmit location data without request at some times and the consumer analytics system may request location data at other times.

In block 203, the location data for each consumer of the multiple consumers is processed to determine characteristics for the consumers. As described in the '280 application that is incorporated herein by reference, the characteristics for a consumer that may be determined from location data include behavior characteristics, preference characteristics, and identity characteristics. In block 203, determining the characteristics of a consumer includes predicting and/or inferring behavior characteristics of the consumer. The behaviors of a consumer that may be indicated by characteristics may include visiting a particular setting (e.g., a particular store), doing a specific activity such as playing golf, or traveling via a specific mode of transportation. The processing of location data of block 203 may be performed by the consumer analytics system contemporaneously with the consumer's movements, as the location data is obtained for the consumer, such as while the consumer is visiting a setting or moving to one or more settings on a path.

As part of the processing of location data for the consumers, the consumer analytics system may determine whether to take an action, including whether to request that the consumer perform a task. To determine whether to take an action, characteristics of consumers inferred and/or predicted during the processing of block 203 are compared to conditions for actions specified in block 201. When conditions for an action are satisfied, the consumer analytics system may take the action. Accordingly, in block 204, based on the characteristics of the consumer inferred or predicted in block 203, an action is triggered when the characteristics satisfy one or more conditions. As discussed above, any suitable actions may have been specified in block 201 and may be taken in block 204. Actions may include sending a consumer one or more survey questions to respond to. The actions may additionally or alternatively include obtaining additional data from an external data source, such as data related to the consumer. Data related to the consumer may include sales transaction data, information entered into social networking or other system, or any other information.

As another example, actions may include adjusting one or more parameters of a visit detection process. The action taken by the consumer analytics system may be taken at any suitable time, including contemporaneously with the consumer's movements.

Overview of Illustrative Computing System

Some embodiments include a consumer analytics system, implemented on a computing device, with a configured set of actions. The consumer analytics system may include a facility for processing location data, a set of points of interest, and a set of actions which can be performed. The facility may be executed by the computing device.

Techniques operating according to principles described herein may be implemented in any suitable manner. For example, the methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of example, methods, program codes, program instructions and the like described herein may be implemented in one or more threads. The threads may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like. "Storage medium," as used herein, refers to tangible storage media. Tangible storage media are non-transitory and have at least one physical, structural component. In a storage medium, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. A software program may be associated with a server that may include a file server, print server, domain server, internet server, intranet server and other variants such as secondary server, host server, distributed server and the like. The server may include one or more memories, processors, storage media, ports (physical and virtual), communication devices, and/or interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more memories, processors, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, and instructions described herein may be executed by one or more of the network infrastructural elements.

The methods, program codes, and instructions described herein and elsewhere may be implemented on a cellular network having multiple cells. The cellular network may either be frequency division multiple access (FDMA) network, a time division multiple access (TDMA) network, and/or a code division multiple access (CDMA) network, or any other suitable form of network implementing any suitable communication protocol and any suitable medium access control protocol. The cellular network may include mobile devices, cell sites, base stations, repeaters, antennas, towers, and the like. The cell network may be a network carrying out a protocol for Global System for Mobile Communications (GSM), General Packet Radio Service (GPRS), any third-generation (3G) network, Evolution-Data Optimized (EVDO), ad hoc mesh, Long-Term Evolution (LTE), Worldwide Interoperability for Microwave Access (WiMAX), or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

Computer software, program codes, and/or instructions may be stored and/or accessed on machine readable storage media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; or other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the drawings and descriptions herein set forth functional aspects of the disclosed systems, no particular arrangement of software for implementing these functional aspects should be inferred from these descriptions unless explicitly stated or otherwise clear from the context. Similarly, it will be appreciated that the various steps identified and described herein may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described herein, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being stored on a machine readable medium.

Computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described herein and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described herein may include any of the hardware and/or software described herein. All such permutations and combinations are intended to fall within the scope of the present disclosure.

Figure 3:
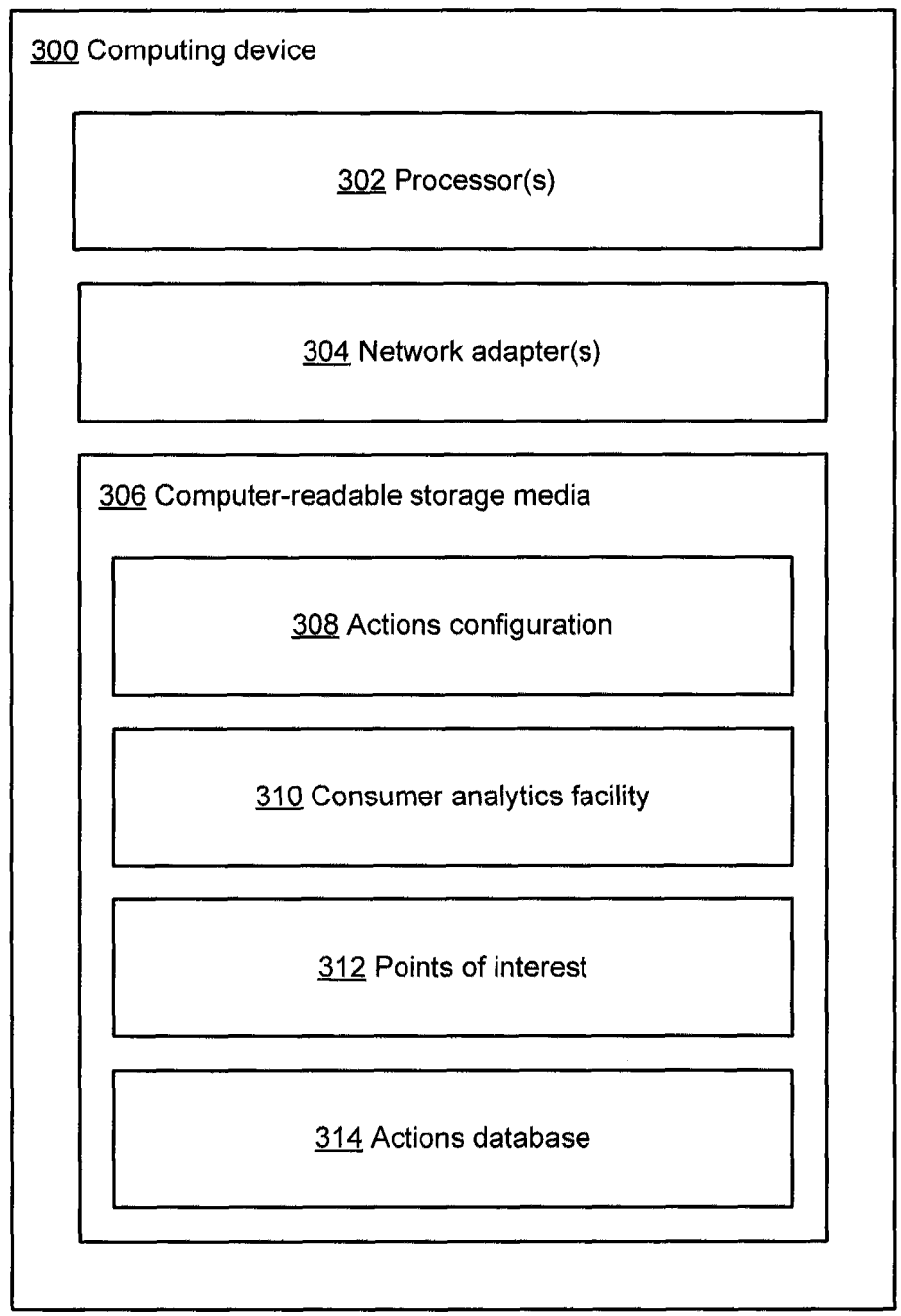
FIG. 3 is a block diagram of an exemplary computing device with which embodiments may operate.

FIG. 3 illustrates one exemplary implementation of a computing device in the form of a computing device 300 that may be used in a system implementing the techniques described herein, although others are possible. It should be appreciated that FIG. 3 is intended neither to be a depiction of necessary components for a computing device to operate in accordance with the principles described herein, nor a comprehensive depiction.

Computing device 300 may comprise at least one processor 302, a network adapter 304, and computer-readable storage media 306. Computing device 300 may be, for example, a desktop or laptop personal computer, a server, a collection of personal computers or servers that operate together, or any other suitable computing device. Network adapter 304 may be any suitable hardware and/or software to enable the computing device 300 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 306 may be adapted to store data to be processed and/or instructions to be executed by processor 302. Processor 302 enables processing of data and execution of instructions. The data and instructions may be stored on the computer-readable storage media 306 and may, for example, enable communication between components of the computing device 300.

The data and instructions stored on computer-readable storage media 306 may comprise computer-executable instructions implementing techniques that operate according to the principles described herein. In the example of FIG. 3, computer-readable storage media 306 stores computer-executable instructions implementing various facilities and storing various information as described herein. Computer-readable storage media 306 may store a location data processing facility 309 for obtaining location data for consumers via network adapter 304 and determining characteristics, including behaviors, of the consumers. The location data processing facility 309 may perform any of the exemplary techniques described herein, and may include any of the exemplary facilities described herein. Computer-readable storage media 306 may also include data sets to be used by the location data processing facility 309, including a data set 308 of actions to run and their associated triggering values, and a data set 310 of points of interests, which could include information about locations and types of points of interest.

While not illustrated in FIG. 3, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

While the invention has been disclosed in connection with the preferred embodiments shown and described in detail, various modifications and improvements thereon will become readily apparent to those skilled in the art. Accordingly, the spirit and scope of the present invention is not to be limited by the examples herein, but is to be understood in the broadest sense allowable by law.

Examples of Techniques for Obtaining Location Data

As mentioned above, embodiments are not limited to implementing any particular technique for obtaining location data. In some embodiments, techniques for obtaining location data described in the '280 application incorporated herein by reference may be implemented.

In some embodiments, a system may use one or more of many different methods for gathering consumer location data based on a personal device (such as a mobile phone, tablet, or laptop computer). Location data may include information identifying a geographic location. Information identifying a geographic location may include latitude, longitude, altitude, and an error measure. Location data may also include a timestamp. In some embodiments, an electronic device associated with and/or operated by a consumer may determine the location data alone and transmit the determined location data to a consumer analytics system. In others, one or more other devices, such as components of a network to which the electronic device is connected and/or able to communicate, may cooperate with the electronic device to determine the location data.

Techniques for obtaining location data that may be used in embodiments include techniques for measuring a physical location of a consumer. Techniques for measuring a location including cell tower identification, enhanced cell identification, Uplink-Time difference of arrival, Time of arrival, Angle of arrival, enhanced observed time difference (E-OTD), GPS, Assisted-GPS, hybrid positioning systems, Global Navigation Satellite System (GLONASS), the Galileo navigation system, location-determination services using access points for wireless local area networks (WLANs), and the like.

In some embodiments, location data comprising measurements of physical location may additionally or alternatively be obtained using paging, triangulation, and the like. A common method is to triangulate a location of the device based on nearby towers that provide wireless phone/data service. In the case of mobile phones, the phones may emit a roaming signal to contact the next nearby antenna tower. The phone's position can be figured out by multilateration based on the signal strength of nearby antennas. A similar method is to do a similar triangulation but instead of using towers used to provide wireless service, use Wi-Fi or other similar systems. This may be particularly useful in cases in which mobile tower signal is poor (in remote areas, for example) or not available on the device.

In some embodiments, in addition to or as an alternative to obtaining location data that includes measurements of physical location using satellite-based systems and/or triangulation, location data may be determined from information stored by data sources that are linked to the user and/or device. Such data may include identifications by a user of setting visited by the consumer or that the consumer is visiting. For example, if a consumer provides information to a data source indicating a location of the consumer, that information may be used in identifying a location of the consumer. Such information may include a message posted to a social networking service saying "I just arrived in Boston." From the user's statement of his or her location, a consumer analytics system with access to the information can infer that the consumer is in the vicinity of Boston. Additionally or alternatively, predictions of location may be used. Predictions may be obtained in any suitable manner. For example, by using an accelerometer built into an electronic device that is carried by a consumer (e.g., an accelerometer of a mobile phone), a speed the consumer is traveling may be estimated and used along with a last known location for the consumer to estimate a current location of the consumer. In some embodiments, multiple different kinds of data indicative of location may be analyzed together in determining locations visited by consumers, which may increase the amount and quality of location data.

In some embodiments, different data sources may also be used to increase the quality of the data collected by changing which data sources are used and how often the data sources are polled. For example, if location data indicates a consumer is moving, it may be useful to increase the rate at which data is gathered.

Location data for consumers may be obtained by a consumer analytics system in any suitable manner. In some embodiments, location data can be pulled by the system. To pull the location data, the consumer analytics system may query a communication network, such as a communication network to which an electronic device associated with a consumer is connected. The network may locate the device in response to the query and produce location data and/or request that the device provide location data. In other embodiments, the consumer analytics system may obtain location data for a consumer by having an electronic device associated with the consumer push location data to the consumer analytics system periodically. In some embodiments in which a device pushes location data periodically, it may be desirable that the device obtains location data and sends the location data to the system automatically and transparently to a consumer associated with the device, without receiving input from the user.

Examples of Processing Location Data to Build a Consumer Profile

The consumer analytics system may receive multiple different units of location data for any given consumer over time. The location data for a consumer may be in the form of a set of data points that each identify a location through which the consumer passed.

From analyzing this location data, a consumer analytics system may generate a unique list of settings visited by each consumer. The list may be "unique" in that the list does not include multiple entries corresponding to a single visit by a consumer to a setting, or because the list does not include multiple listings for a setting. To generate the unique list, the consumer analytics system may identify "anchors" from locations that are similar in time and space. The consumer analytics system may also identify settings corresponding to the anchors and may produce information about a consumer based on the settings visited by a consumer. Additionally, by analyzing the unique list of physical locations and/or settings visited by a consumer, patterns can be identified in the settings that may be used by the consumer analytics system to determine characteristics of a consumer. For example, an identity, behaviors, and preferences of the consumer can be identified through analysis of location data. The location data that is analyzed may include an identification of locations at which the consumer was present and/or settings visited by the consumer. Additionally, personally-relevant locations for the consumer, such as the place of residence and place of employment of the consumer, can be determined through analysis.

The consumer analytics system may also examine sets of location points corresponding to movement, rather than only location points corresponding to stops the consumer made at particular locations, to determine characteristics of a consumer. Location data corresponding to movement may provide information about paths traveled by a consumer. For example, by using the distance and time between points, the consumer's speed can be computed. The consumer's speed, along with whether or not the points are over roads, rail lines, etc. may be used to determine if a consumer is traveling by car, rail, plane, etc. In addition, the distance from the consumer's home of a location visited by a consumer can be computed using information about a path.

The '280 application that is incorporated herein by reference describes in detail techniques that may be implemented in some embodiments for determining anchors, paths, and settings from location data for a consumer. The '280 application also describes in detail techniques that may be implemented in some embodiments for analyzing location data, anchors, paths, and settings to determine characteristics of consumer.

Visit Detection

In some embodiments, when a consumer analytics system receives location data for a consumer, the consumer analytics system may perform a visit detection process on the location data to identify settings visited by consumers. A setting may be a place to which a location corresponds, such as a commercial or non-commercial place (e.g., business or park). A position of a setting may correspond to a set of physical location falling within defined location boundaries of the setting, as discussed below. When a consumer is detected to have been present at a location falling within the location boundaries of a setting, through a visit detection process the consumer can be detected to have visited the setting.

A visit detection process may be performed by a consumer analytics system in any suitable manner, as embodiments are not limited to identifying settings visited by consumers in any particular way. Examples of ways in which a visit detection process may be carried out are described below and in the '280 application that is incorporated by reference herein.

A visit detection process may be carried out because, in some embodiments, one element of detecting consumer characteristics, including behavior characteristics, from location data is to determine what stores, restaurants, sports venues, and other settings a consumer visits. The process 400 of FIG. 4 is an example of a visit detection process that may be carried out in some embodiments.

Figure 4:
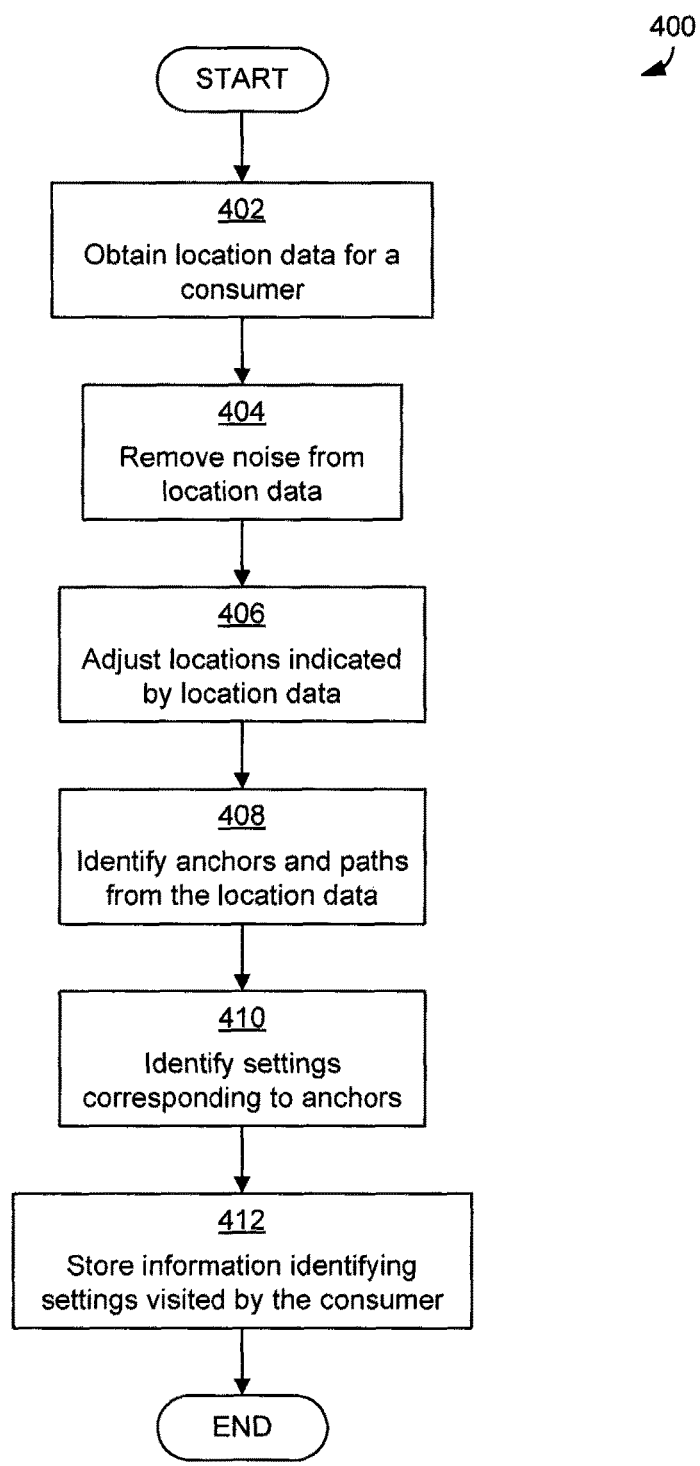
FIG. 4 is a flowchart of an example of a process for determining a setting visited by a consumer based on location data obtained for the consumer.

The process 400 of FIG. 4 begins in block 402, in which a set of location data points for a consumer is obtained. The location data points may be obtained in any suitable manner, examples of which are described above. In block 404, the location data may be analyzed to remove "noise" from the location data points. Noise in the location data points may include location data points that are not valid. Invalid location data points may include points indicating locations that are not physically possible or very unlikely. Impossible or unlikely location data points may include data points such as:

Points that indicate the consumer is traveling faster than the speed of sound; and A trail of connected points roughly following a line with one outlier that is clearly disconnected.

In order to remove the noise in block 404, the consumer analytics system can traverse the location data points for a consumer one-by-one and discard any location data points that do not meet one or more criteria for not being noise or satisfy one or more criteria for being noise. Criteria for being noise may include detecting that a location data point is either physically impossible or very unlikely, or any other suitable criteria.

Once noise is removed in block 404, as part of the processing of location data, in block 406 the consumer analytics system may enhance the data by adjusting locations indicated by location data. For example, location data points may be pushed from unlikely places to likely places. As an example, if the time and distance between points and altitude indicate the consumer is likely traveling in a car, the points obtained during this time could be cross-referenced with the known location of roads. The points could be moved to correspond to a road, which is most likely where the point is given that the car would likely be driving on roads. Adjusting the location data points in this way may compensate for errors in the locations identified by location data points, such as errors that may result from imprecise processes for obtaining location data.

Once a good set of location data points for a consumer have been obtained through processing of block 402-406, the location data points can be analyzed to identify travel paths ("paths") and stationary locations ("anchors"). Paths and anchors may be identified by the consumer analytics system in block 408 by looking at the time and distance between points and by applying a clustering algorithm. For example, such a clustering of the sequential location points may be carried out using Euclidian distance clustering. In one example of a Euclidean distance clustering, locations within 200 meters of one another may be identified as being related to a same potential anchor. In some embodiments, each location identified by location data processed by the consumer analytics system may include an uncertainty radius. The uncertainty radius around each location may be used to more accurately cluster nearby location points using statistical methods. When a location indicated by a location data point is similar to a location indicated by another location data point and is within the uncertainty radius of the other location data point, the consumer analytics system may conclude that the location data points both relate to one location visited by a consumer. An anchor may be identified at least in part as a cluster of locations corresponding to multiple different location data points. Additionally, by comparing time differences between location points related to the same potential anchor, a duration of time spent by consumer at the potential anchor can be determined. Each cluster of locations associated with a duration above a threshold, such as duration of greater than five minutes, may be identified by the consumer analytics system as an anchor. In some embodiments, the calculated location for an anchor may be a geometric mean of the individual location data points associated with the anchor.

In block 410, the consumer analytics system may use the anchors to identify settings visited by a consumer. The consumer analytics system may utilize a data set of settings, including Points of Interest (POIs), to identify settings, including identifying locations corresponding to POIs defined in the data set. The data set may include a collection of places of one or more kinds (e.g., stores, restaurants, sports venues, transportation terminals, office buildings, etc.) that a consumer may visit. Each setting in the data set may be defined at least in part as a polygon that defines a location of the point of interest. Examples of ways in which the polygon may be defined are described in detail below. Additionally, in some embodiments, information regarding a setting may include a set of operational information (e.g., the hours of operation, the operational type, e.g., a terminal for plane/boat/rail travel, etc.) and a set of categorical information about the setting (e.g., a retail location, restaurant, or stadium).

The consumer analytics system may identify the settings visited by the consumer by examining each anchor and determining a likelihood that the consumer visited the given POI. A consumer analytics system may determine the likelihood in any suitable manner, as embodiments are not limited in this respect. In some embodiments, the likelihood may be calculated by the consumer analytics system based on a number of factors, including:

the likelihood that a cluster of location points representing the anchor corresponds to a location within the bounds of the POI;

whether the time range of the anchor falls within the operational hours of the POI;

whether the anchor duration falls with the expected visit duration to the given POI (e.g., consumers typically spend 1.5-3 hours at movie theatre; a visit of 30 minutes is unlikely);

whether the already-computed behavior of the consumer indicates that she is likely to visit the POI or visit the POI at the time-of-day, day-of-week, time-of-year, etc. at which location data for the anchor was collected;

and any other suitable factors.

When a likelihood of an anchor matching a setting is calculated by the consumer analytics system, the likelihood may be compared to a threshold. If the likelihood exceeds the threshold, the anchor may be determined to correspond to the setting and the consumer may be determined to have visited the setting. Any suitable threshold having any suitable value may be used, as embodiments are not limited in this respect. Additionally, the threshold may be used for any suitable number of settings. In some embodiments, the same threshold may be used by the consumer analytics system for all settings, such that each time the consumer analytics system calculates a likelihood of an anchor corresponding to a setting, the likelihood may be compared to the threshold. In other embodiments, different thresholds may be used for different settings. In some embodiments that use multiple different thresholds, each setting in the set of settings that can be identified through the visit detection process may be associated with an individual threshold corresponding to that setting. When a likelihood of a consumer visiting the setting is calculated, the likelihood may be compared to the threshold for that setting. In other embodiments that use multiple different thresholds, a group of multiple settings may share a threshold. Any suitable group of settings may be defined, as embodiments are not limited in this respect. Settings having a similar location or being of a similar type may be grouped in some embodiments.

In block 412, once the consumer analytics system has matched location data for consumers to settings visited by the consumers in block 410, the consumer analytics system may store information resulting from the determination of block 410. The stored information may include information identifying that a consumer has visited a setting, when an anchor for a consumer was determined to match a setting. The stored information may also include information identifying that an anchor of a consumer was not matched to any settings, if the consumer analytics system could not match an anchor to settings. Once the information is stored in block 412, the process 400 ends.

Following the process 400, the information stored by the consumer analytics system may be used in any suitable manner. For example, as discussed herein and in the '280 application incorporated herein by reference, settings visited by consumers may be analyzed to determine characteristics of consumers and/or to conduct market research. Characteristics of consumers determined from the settings may also be compared to conditions for actions, and a consumer analytics system may take an action in response to determining that one or more characteristics of one or more consumers satisfy conditions for an action. As another example, information identifying that an anchor for a consumer does not match any settings for which the consumer analytics system has information may prompt adjustments to the visit detection process, including adjustments to definitions of settings. As discussed in detail below, in some cases in which the consumer analytics system cannot match an anchor for a consumer to a setting, the consumer and/or an administrator of the consumer analytics system may be prompted to provide information about the location visited by the consumer and this information may be used to define a setting. Once the setting is defined, the consumer analytics system may be able to match anchors to that setting.

The exemplary visit detection process described above in connection with FIG. 4 was described as being carried out by a consumer analytics system in response to receiving location data from a source of location data, such as a device associated with a consumer. It should be appreciated, however, that embodiments are not limited to implementing the visit detection process on a server or any other computing device that receives location data from another device. In some embodiments, a device that measures a physical location of a consumer may perform a visit detection process. In such cases, the device may measure the physical location of the consumer over time and apply a visit detection process as above by comparing locations of the consumer to definitions of settings. The set of settings may be stored on the device that measures the location and performs the visit detection process or may be stored elsewhere accessible to the device, such as on a server that the device may communicate with over a network (e.g., a local network or a wide-area network such as the Internet).

POI Data Set

As mentioned above, in some embodiments, POIs within the POI data set may be defined in the data set using a polygon. As part of defining a polygon for a POI, the POI may be assigned "rooftop" latitudes and longitudes that correspond to the boundaries of the POI, which may correspond to a building's physical footprint in the case where the POI is associated with building and boundaries of the POI correspond to boundaries of the building. While the boundaries may be described in terms of a "rooftop," it should be appreciated that POIs are not limited to settings associated with buildings, and that some POIs may not have a rooftop to which the boundaries of a polygon correspond. In the case of a park, for example, a "rooftop" of the park may correspond to edges of the park.

Polygons defined in part based on rooftop latitude and longitudes may assist in identifying settings visited by a consumer based on location data for the consumer. Many conventional POI data sets include only approximate street-level location (which may be a nearest street address) and may contain no information about the size of a POI. However, the street-level location for a POI may be hundreds of meters from a building's actual location. For example, many retailers, hotels and sports venues are set back and separated from the street address marker by large parking lots. Thus, when location data for a consumer indicates the consumer's geographic location and the consumer visits such a setting, the consumer's geographic location may be hundreds of meters from the street-level location for the setting. Matching the consumer's geographic location to a street-level location for a POI may therefore be difficult for some POIs. Embodiments may therefore implement methods to populate a POI data set with rooftop data and produce, based on the rooftop data, a polygon defining locations of boundaries of a POI, including geographic locations of the boundaries.

Rooftop data and polygons may be provided to a POI data set of a consumer analytics system in any suitable manner, as embodiments are not limited in this respect. In some embodiments, a consumer analytics system generates preliminary information identifying locations of POIs using commercially-available geo-location mapping services. A service such as the Mapquest API Service or the SimpleGeo "Places" API may be used. The preliminary information identifying locations may be refined to rooftop data. Any suitable technique for identifying rooftop data may be used, including the two following examples.

Image Processing Boundary Detection:

This method identifies building boundaries in publicly available satellite images, such as those provided by Mapquest. Once a preliminary geo-coded latitude/longitude is identified for a POI, a satellite image is acquired which is centered on the geo-coded latitude/longitude, and an automated boundary detection scheme identifies all unique building rooftops in the image. Each building rooftop is scored against the rooftop characteristics of the POI of interest, including but not limited to, the shape (e.g. square, rectangular, ovoid), size/area, and proximity to other building rooftops. The building rooftop with the highest score is matched to the POI of interest, and the confidence of the match is determined, taking into consideration the match scores to all nearby unique building rooftops. For example, to automatically identify COSTCO® POIs, the scoring routine may indicate an optimal match for rectangular buildings with an area between a predefined range that roughly corresponds to the range of expected COSTCO® building areas, and which are physically separated from nearby buildings.

The automated boundary detection scheme may be implemented in a variety of ways, including, but not limited to, watershed edge detection, snake models, active contours (S. Ahmadi, *Automatic urban building boundary extraction from high resolution aerial images using an innovative model of active contours*, Int. J. Applied Earth Observation and Geoinformation 12(3) 150-57 (2010), incorporated herein by reference in its entirety), and curve evolution (K. Karantzalos, *Automatic model-based building detection from single panchromatic high resolution images*, Proceedings of the Int. Society for Photogrammetry and Remote Sensing Congress Volume XXXVII Part 3A, Pages 127-32 (2008), incorporated herein by reference in its entirety). In one implementation, the satellite image is first converted to greyscale, histogram equalized, Wiener filtered to remove high-frequency noise, converted to black/white, filtered to remove white segments less than a minimum specified area, opened and closed to remove edge noise, and holes filled, prior to watershed boundary detection. In a final step, a best-fit rectangle can be matched to each building boundary.

The robustness of this automated boundary detection approach can be improved by manually verifying (and adjusting, if necessary), the boundaries of POIs whose confidence is less than a minimum confidence threshold, e.g. through manual boundary adjustment.

Efficient Manual Boundary Detection & Adjustment:

This method utilizes a graphical software interface, e.g. via a web-based application, so that individuals can efficiently and accurately verify POI locations on a satellite map and, if needed, click on the map to adjust the POI location. In this graphical application, the preliminary geo-coded location of each POI is displayed on a satellite map, and the user can re-center the marker onto the rooftop of the POI simply by clicking on the POI. The user can next identify the boundaries of the POI by clicking on all corners of the building. Alternately, the boundaries of the POI can be efficiently estimated by a single click which specifies the radius of a best-fit circle with center point set by the first mouse click. The user may repeat this process multiple times until satisfied with the boundary placement, and then may save the final boundary choice (e.g. by clicking a 'save' button), at which time the POI boundaries are saved to the POI database. The primary advantage of this method is that the user may consult multiple forms of imagery, e.g. 45 degree or birds-eye-view aerial imagery, and street view imagery, in addition to orthogonal satellite imagery to verify the identity of the POI of interest prior to recording its boundaries. This method may be used in combination with the automated boundary detection method to verify/adjust automatically determined POI boundaries, when necessary.

Triggering Data Collection Actions Based on Determined Consumer Characteristics

In some embodiments, location data, as well as settings visited by a consumer and/or paths or trips taken by consumers, may be analyzed by the consumer analytics system to infer and/or predict characteristics of consumers or groups of consumers. The characteristics of consumers may be used to build profile about consumers, and these profiles may be used to perform market research. In addition, in some embodiments, location data can be used to discover when a consumer exhibits characteristics of interest, including performing a behavior of interest.

A characteristic of interest, including a behavior of interest, may be any suitable characteristic (including a behavior characteristic) of a consumer that may be determined from location data and in which a market researcher may be interested. Characteristics of interest, as mentioned above, may be related to conditions of an action that may be taken by a consumer analytics system. The characteristics may relate to commercial activities of consumers. For example, a market researcher may be interested in better understanding how consumers choose which kind of peanut butter to buy. By processing consumers' location data and identifying, using a visit detection process, stores visited by consumers, the consumer analytics system may be able to detect when a consumer has arrived at or was present at a store that sells peanut butter. In response to inferring a behavior characteristic for a consumer indicating that the consumer has visited the store, the consumer analytics system may take an action that includes sending the consumer a message prompting the consumer to answer survey questions. The survey questions may ask whether the consumer bought peanut butter, which, if any, kinds of peanut butter the consumer bought, and why, and/or kinds of peanut butter the consumer did not buy and why not. The consumer's responses to these survey questions may aid the market researcher in understanding the mindset that went into the consumer's decision to purchase peanut butter.

As mentioned above, characteristics of a consumer that may be determined from location data include behavior characteristics of consumers that relate to behaviors of the consumers. Behaviors of consumers may include behaviors that extend for a period of time. For example, a consumer's visit to a setting or a consumer's shopping trip that includes visiting one setting and driving past another setting may be behaviors that extend for a period of time (e.g., the period of time the consumer was at a setting). When a behavior extends for a period of time, in some embodiments a consumer analytics system may obtain location data for the consumer, determine characteristics for the consumer, and carry out an action while the behavior is ongoing. In some such embodiments, the consumer analytics system may determine characteristics of consumers and take action contemporaneously with a consumer's behavior by determining the characteristics and taking action when the consumer is predicted to be about to engage in a behavior, when the consumer is determined to be engaging in the behavior, when the consumer is determined to have recently ended a behavior, and/or when the consumer is detected to be about to end a behavior. A consumer analytics system may take an action contemporaneously with a consumer's behavior when the consumer has not yet engaged in another behavior or moved in a manner from which the consumer analytics system has determined another behavior of the consumer.

As discussed above in connection with FIG. 2, a consumer analytics system may receive input defining any suitable action to be taken in response to any suitable condition(s). The condition(s) may relate to any suitable one or more characteristics of one or more consumers determined by a consumer analytics system from location data for one or more consumers. The characteristic(s) that may be determined by the consumer analytics system and that may satisfy conditions for an action may include one or more characteristics of a single consumer inferred or predicted by the consumer analytics system. Additionally or alternatively, the characteristics may include one or more characteristics that are shared by consumers of a group of consumers and that are inferred or predicted by the consumer analytics system, or one or more characteristics of a group that are not associated with any particular consumer (e.g., an average characteristic for a group). The characteristics that may be determined for one or more consumers may be characteristics that relate to commercial activity of one or more consumers.

As mentioned above and as described in detail in the '280 application incorporated herein by reference, characteristics for one or more consumers that may be inferred or predicted by a consumer analytics system may include behavior characteristics, identity characteristics, or preference characteristics.

Behavior characteristics may include any suitable information regarding behaviors of a consumer. Characteristics of behaviors may include information about activities in which a consumer does or does not participate or a manner in which the consumer participates in an activity. Information on a manner in which the consumer participates in an activity may include information on a frequency or periodicity of the consumer's participation in the activity. Additionally, predictions of whether a consumer is likely to participate in an activity may be inferred or predicted as behavior characteristics. Behaviors of a consumer may include retail-relevant behaviors and lifestyle-relevant behaviors. Retail-relevant behaviors may include behaviors relating to commercial activities engaged in by a consumer. Commercial activities may include activities in which a monetary transaction takes place or could take place, including visits to any location at which consumers could purchase products or services. Lifestyle-relevant behaviors may include information about consumers' work life, home life, and regular routine, including their recreational behaviors. Lifestyle activities include visits to and time spent at a consumer's residence and place of employment; travel patterns and habits, including commuting patterns and air travel; and visits to outdoor recreation destinations, nightlife locations, sports and entertainment venues, museums, amusement parks, tourist destinations, or other recreational destinations.

Identity characteristics may include demographic and socioeconomic attributes of a consumer. Demographic and socioeconomic attributes of a consumer may include where a consumer lives, information about a consumer's family, where a consumer works, and what a consumer does for work.

Preference characteristics may include information on preferences of a consumer regarding commercial activities and/or lifestyle-relevant activities in which the consumer engages or desires to engage. Preference characteristics regarding commercial activities of a consumer may include preferences of the consumer for particular types of products or services or particular products or services. Brand loyalties of a consumer may be included in preference characteristics for the consumer.

For characteristics that a consumer analytics system is configured to infer or predict based on location data, the consumer analytics system may also infer or predict a strength of the characteristic or a likelihood that the characteristic has been correctly inferred/predicted.

Any characteristic of a consumer or group of consumers that is inferred/predicted by the consumer analytics system for the individual consumer or for a group of consumers in which the consumer is included may be a condition of an action or may be evaluated to determine whether one or more conditions have been satisfied. In examples described below, characteristics of a consumer that may trigger a consumer analytics system to take an action include behavior characteristics that relate to commercial activity, including that relate to a commercial activity in which the consumer is engaging at the time the behavior characteristics are identified. In some embodiments, identity and/or preference characteristics may additionally or alternatively satisfy conditions that, when met, trigger the system to take an action. Further, while examples of behavior characteristics that may trigger an action are described herein, it should be appreciated that characteristics of a consumer related to any suitable behaviors may be used as conditions of an action or evaluated to determine whether one or more conditions have been met. Examples of behaviors that, in embodiments, could trigger a consumer analytics system to take actions when the system infers/predicts characteristics of a consumer related to the behavior include (but are not limited to):

Outdoor recreational (hiking, biking, swimming, sailing, beach, etc.);

Viewing or playing sports (baseball, football, golf . . . );

Watching a movie in a movie theatre;

Visiting a known location (like one's place-of-work or home);

Going inside a retail store, restaurant, convention center, or other point of interest;

Driving past a retail, store, restaurant, convention center, or other point of interest;

Traveling on a path that includes visits to particular stores, such as a first store or store of a first type (e.g., a grocery store) and a second store or store of a second type (e.g., a department store that includes a grocery department);

Deviating from a behavioral pattern, such as by visiting a setting or type of setting the consumer does not typically visit;

Traveling toward a setting;

Making a purchase at a setting;

Moving in a trip that includes a visit to one setting or type of setting and does not a visit to another setting or another type of setting;

Driving past a billboard or other "Out of Home" (OOH) advertisement;

Taking a trip by air, rail, car, bus, or boat; and

Any combination of the foregoing.

Examples of Types of Actions That May Be Triggered

As consumer characteristics are predicted and/or inferred by a consumer analytics system of a consumer analytics system, the consumer analytics system may take one or more actions when conditions for taking the actions are satisfied by the characteristics. Any suitable action may be taken. In some embodiments, information collection actions may be triggered by consumer characteristics meeting conditions for the actions. In some embodiments, information storage actions may be triggered by consumer characteristics meeting conditions for the actions.

An information collection action that may be taken by a consumer analytics system may include collecting any suitable information from any suitable source. In some cases, a consumer analytics system may collect information from a consumer by soliciting information from the consumers. Information may be solicited in any way, including by sending messages to a consumer requesting that the consumer perform a task. In other cases, a consumer analytics system may collect information from a data source external to the consumer analytics system. information that may be collected by a consumer analytics system may include any suitable information, including information related to one or more commercial entities, products, and/or services. In some embodiments, a consumer analytics system may collect information relating to commercial activity. Information regarding commercial activity may relate to commercial activity of a consumer and/or of a commercial entity. Information regarding a commercial activity may relate to a consumer, a commercial entity, and/or interactions between a consumer and a commercial entity. The information that is collected may be information that the consumer analytics system may evaluate to determine characteristics of a consumer and/or characteristics of a group of consumers related to commercial activity, such as behavior, identity, or preference characteristics of a consumer or behavior, identity, or preference characteristics shared by consumers of a group of consumers.

Examples of actions are described below, including examples of tasks that a system may request a consumer perform and examples of information that may be retrieved by a system from an external data source or transmitted to an external data store for storage. It should be appreciated, however, that embodiments are not limited to operating according to these examples, as embodiments are not limited to taking any particular action or type of action in response to satisfaction of one or more conditions.

Figure 5:
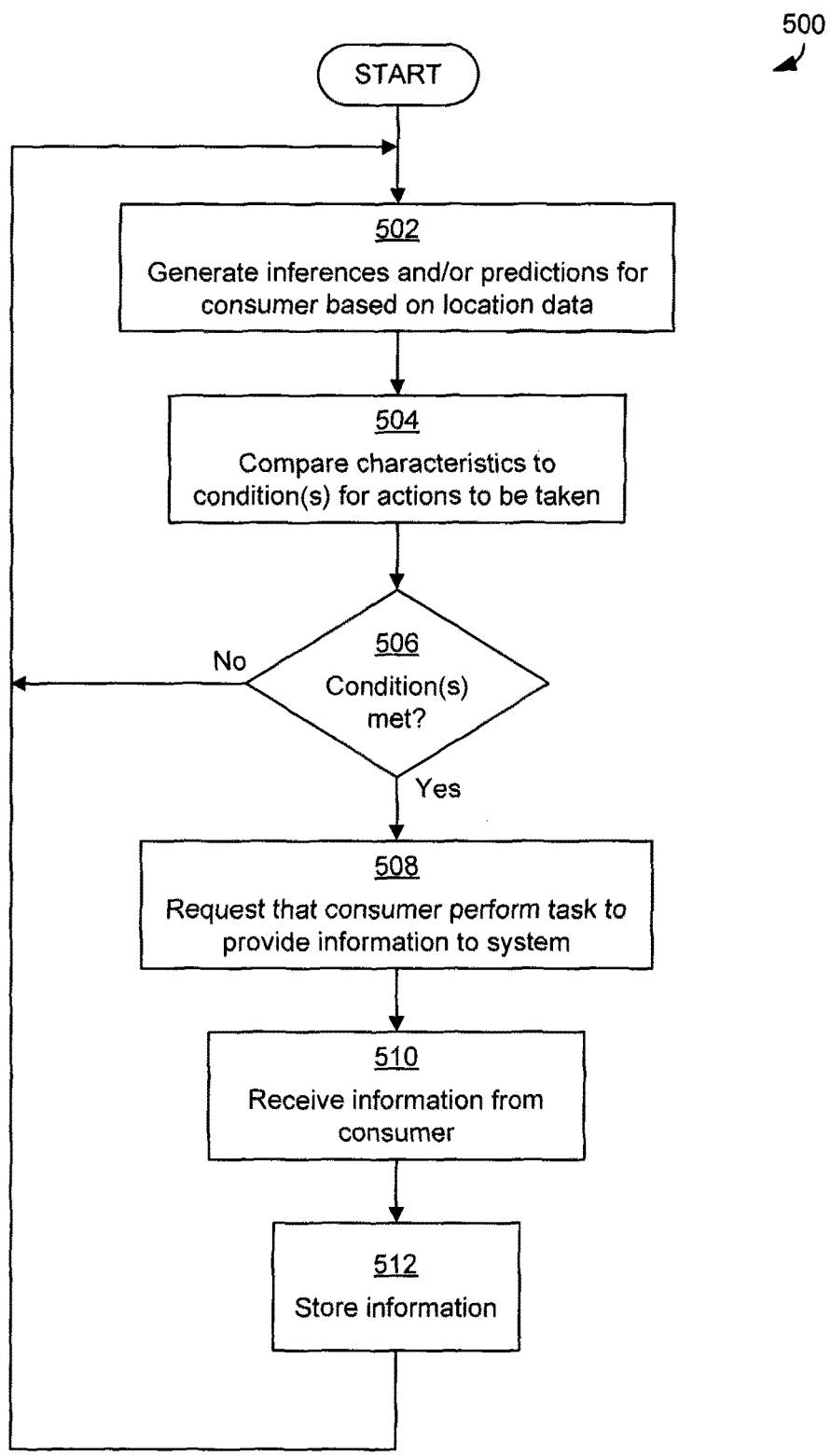
FIG. 5 is a flowchart of an example of a process for requesting that a consumer perform a task in response to an evaluation of location data for the consumer.

FIG. 5 illustrates an exemplary technique that may be performed by a consumer analytics system to solicit information from a consumer in response to conditions for the solicitation being met. Prior to the start of the process 500 of FIG. 5, one or more actions and one or more conditions for triggering the actions are specified to the consumer analytics system, such as using techniques described above in connection with FIG. 2. The consumer analytics system may also register multiple consumers with the system, which may include storing information identifying consumers and devices associated with consumers. In some embodiments, the information identifying consumers and devices may not personally identify consumers, through the information may uniquely identify consumers in the consumer analytics system. Once consumers are registered with the system, location data for the consumers is received by the system and processed by a consumer analytics system of the consumer analytics system.

The process 500 begins in block 502, in which the consumer analytics system of the consumer analytics system generates predictions and/or inferences of one or more characteristics of one or more consumers or groups of consumers based at least in part on the location data for the consumers. The consumers for which the characteristics are determined in block 502 may be any suitable consumers. In some embodiments, the consumers may be any consumers that are registered with the system and for which the system receives location data. In other embodiments, the consumers for which characteristics are determined in block 502 include consumers that are members of a pool of consumers that are subjects of a market research study. The pool of consumers may be selected manually and/or automatically to have an assortment of characteristics, such as an assortment of identity characteristics. In some embodiments, as part of defining a market research study to be conducted, desired characteristics of consumers to be included in a pool of market research subjects are identified.

The location data that is processed by the consumer analytics system in block 502 may include any suitable location data. The location data may include location data identifying measured physical locations of consumers and/or location data identifying settings visited by consumers and/or paths traveled by consumers. In some embodiments, the consumer analytics system may analyze location data together with any other suitable data, such as profile data for consumers identifying characteristics previously defined for consumers.

The consumer analytics system may determine any suitable characteristics as inferences and/or predictions in block 502, as discussed above. The characteristics that may be inferred and/or predicted may include behavior characteristics related to behaviors of consumers, including behaviors in which the consumers were engaging at the time the location data was generated. In addition, the consumer analytics system may determine the predictions and/or inferences at any time relative to a time at which the location data is received by the system. In some embodiments, location data may be received by the consumer analytics system as a stream of measurements of physical location that is transmitted to the consumer analytics system as the locations are visited by the consumer, such that the consumer analytics system receives data indicating locations of consumers contemporaneously with the consumers being present at the locations, in substantially real time. In some such embodiments, the consumer analytics system may also analyze the location data as the location data is received and generate predictions and/or inferences in substantially real time. In embodiments in which the characteristics are determined in substantially real time, the characteristics may be determined while the consumer is still present at a location from which the characteristics were inferred and/or predicted, or while the consumer is traveling to the location or traveling away from the setting. Though, in other embodiments, the consumer analytics system may receive location data at any time and the consumer analytics system may analyze location data at any time, as embodiments are not limited in this respect.

In block 504, the consumer analytics system compares the one or more characteristics for one or more consumers or groups determined by the consumer analytics system to one or more conditions of one or more actions that may be taken by the consumer analytics system. The characteristics of consumers that are compared in block 504 may include characteristics inferred and/or predicted at any time by the consumer analytics system, including characteristics inferred and/or predicted based on different location data obtained at different times. The comparison may be carried out in any suitable manner. For example, in some embodiments a characteristic determined by the consumer analytics system may be compared to a condition to determine whether the determined characteristic matches the characteristic defined in the condition. Such a matching may be carried out in cases where the condition is that a type of characteristic be determined, such as a behavior characteristic indicating that a consumer visited a particular store or visited a particular store on the way to work. As another example of a comparison, in some embodiments a value of a characteristic may be evaluated with respect to a value indicated by the condition. Such an evaluation may be carried out in cases where the condition is that a quantitative or qualitative attribute of a characteristic have or exceed a particular value, such as a condition that a behavior characteristic of a consumer indicate that the consumer spent more than two hours at a particular retail business. Any suitable comparison may be carried out in block 504, as embodiments are not limited in this respect.

In block 506, the consumer analytics system determines whether characteristic(s) for a consumer or group of consumers satisfy the condition(s) for an action to be taken. If not, the process 500 returns to block 502, in which the consumer analytics system analyzes location data (which may include newly-received location data) to determine characteristics for consumers. If, however, the condition(s) for an action are met, the consumer analytics system takes the action. In the example of FIG. 5, the action taken by the consumer analytics system is soliciting information from a consumer. The characteristics of the consumers determined in block 502 may have been determined for the consumer that is to be solicited or may have been determined for other consumers or a group of consumers, including a group of which the consumer to be solicited is a member or a group of which the consumer to be solicited is not a member. Accordingly, in block 508, the consumer analytics system compiles one or more messages to be transmitted to the consumer soliciting the information. The message(s) may describe the information desired to be collected from the consumer. The system may then transmit the message(s) to the consumer. The message(s) may be in any suitable format and include a request for any suitable information, including information relating to commercial activity. For example, the request for information may be a request for the consumer to provide information on opinions or observations of the consumer, including by answering survey questions. As another example, the request for information may be a request that the consumer interact with a commercial entity, such as by visiting the entity, moving around a setting of the commercial entity, and speaking with staff for a commercial entity. Such a request may include a request to provide media of a subject relating to a commercial entity to the consumer analytics system, such as an image, video, and/or audio of the subject. As another example, the request for information may be a request for information regarding purchasing behavior of the consumer, such as with respect to a commercial entity. The request may be a request that the consumer scan barcodes of items purchased by the consumer and provide information resulting from the scans to the system.

The message may be transmitted to the consumer by the consumer analytics system in any suitable manner. In some embodiments, the message may be transmitted to a consumer's smartphone, including to an application executing on the consumer's smartphone. In some embodiments in which the message is transmitted to the consumer's smartphone, information about a consumer stored by the consumer analytics system may not personally identify the consumer. In such a case, the consumer analytics system may not have a phone number or other identifier for a consumer's phone that may be used by the system to transfer the message directly to the consumer's phone. The consumer analytics system may therefore communicate to a cellular network or other service provider to request that the message be transmitted to the consumer's phone, or may communicate to any other suitable intermediary requesting that the message be made available to the consumer's phone. In other embodiments in which the message is transmitted to the consumer's phone, however, the consumer analytics system may be able to communicate directly to the consumer's phone and transmit the data to the consumer's phone. In some embodiments, the message may not be transmitted to a consumer's phone, but may be transmitted to a consumer via electronic mail, instant message, or in any other suitable manner. Further, embodiments are not limited to transmitting the message to the consumer at any particular time. In some embodiments in which location data is received and analyzed in substantially real time, the consumer analytics system may transmit the message to the consumer in substantially real time. By transmitting the message to the consumer in substantially real time, the consumer may receive the message while the consumer is still at a location from which the consumer analytics system determined characteristics that satisfied the conditions. In other embodiments, however, the message may be transmitted to the consumer at a later time. For example, in some embodiments, the consumer analytics system may generate messages and hold the messages until the consumer, an application executing on the consumer's phone, or another entity requests that the messages be transmitted to the consumer.

In block 510, once the message(s) has been transmitted to the consumer soliciting information from the consumer, the consumer analytics system may wait for the consumer to provide the requested information. Upon receiving the information from the consumer (which may include responses to survey questions, media (e.g., an image, video, and/or audio), and/or any other requested information), in block 512 the consumer analytics system stores the received information. The information may be stored in connection with a profile for the consumer or may be stored in any other suitable manner. Once the information is stored, the process 500 continues to block 502, in which the consumer analytics system processes location data (which may include newly-received location data) to determine characteristics for consumers.

As a result of the process 500, the consumer analytics system stores information received from consumers. The information received from consumers may be retrieved and provided to any suitable entity, including market researchers, along with any other results from a market research study. Other results may include one or more consumer characteristics determined from location data. In some embodiments, data received from a consumer in response to a request for data may be analyzed by the consumer analytics system to determine characteristics for the consumer. For example, if the consumer was asked to provide demographic information and brand preference information in response to a survey, the consumer analytics system may determine identity and preference characteristics for the consumer by analyzing the data received from the consumer. As another example, if the consumer was asked to provide the name of a commercial entity the consumer shops at or was asked to scan the barcode of a product purchased by the consumer, the consumer analytics system may determine behavior characteristics of the consumer from the name of the commercial entity or the product owned by the consumer. In addition, information collected from multiple consumers may be analyzed to determine trends or patterns in the information from the consumers. For example, data may be analyzed to determine patterns with respect to characteristics of consumers who provided the information. The characteristics of the consumers may have been determined from location data for the consumers. Thus, the system may identify consumers who provided the same answer to a survey question and who share one or more identity, behavior, and/or preference characteristic.

As another result of the process of FIG. 5, the consumer analytics system may determine an incentive to provide to the consumer and provide that incentive to the consumer. The incentive may be a reward for the consumer providing the solicited information to the consumer analytics system and/or an inducement for the consumer to provide more information in the future, in response to future messages from the consumer analytics system. The consumer analytics system may provide any suitable incentive, as embodiments are not limited in this respect. As one example of an inducement, the consumer analytics system may provide a monetary incentive to the consumer, such as by transmitting money to the consumer in any suitable manner. For example, a payment may be made to an account for the consumer (e.g., a credit card account or bank account) or a check may be provided to the consumer. Monetary incentives, when provided, may be provided to the consumer at any time, such as close in time to the consumer providing the information to the consumer analytics system or at a later time, such as at a set interval, after the consumer has provided information a number of times, once the aggregate payment amount has reached a threshold, or upon request of the consumer. As another example of an incentive, any suitable item other than money may be provided to the consumer, such as a coupon that is redeemable with a commercial entity. The consumer analytics system may provide any suitable coupon to the consumer in response to the consumer's provision of information to the system. In some embodiments, the consumer analytics system may determine a commercial entity for which to offer a coupon from the characteristics determined for a consumer based on location data for the consumer. For example, if the consumer analytics system infers from location data that the consumer is a customer of a particular retail store, or predicts that the consumer may be interested in a particular retail store, a coupon for that retail store may be provided. As another example, if the consumer analytics system determines that the consumer is at a setting corresponding to a particular commercial entity, a coupon related to that commercial entity may be provided to the consumer.

In the example of FIG. 5, the solicitation of information in response to determining characteristics of a consumer was described generally. Two examples of tasks that a consumer analytics system may ask a consumer to carry out when conditions are satisfied are described below in connection with FIGS. 6-8. It should be appreciated, however, that embodiments are not limited to operating in accordance with these examples.

Figure 6:
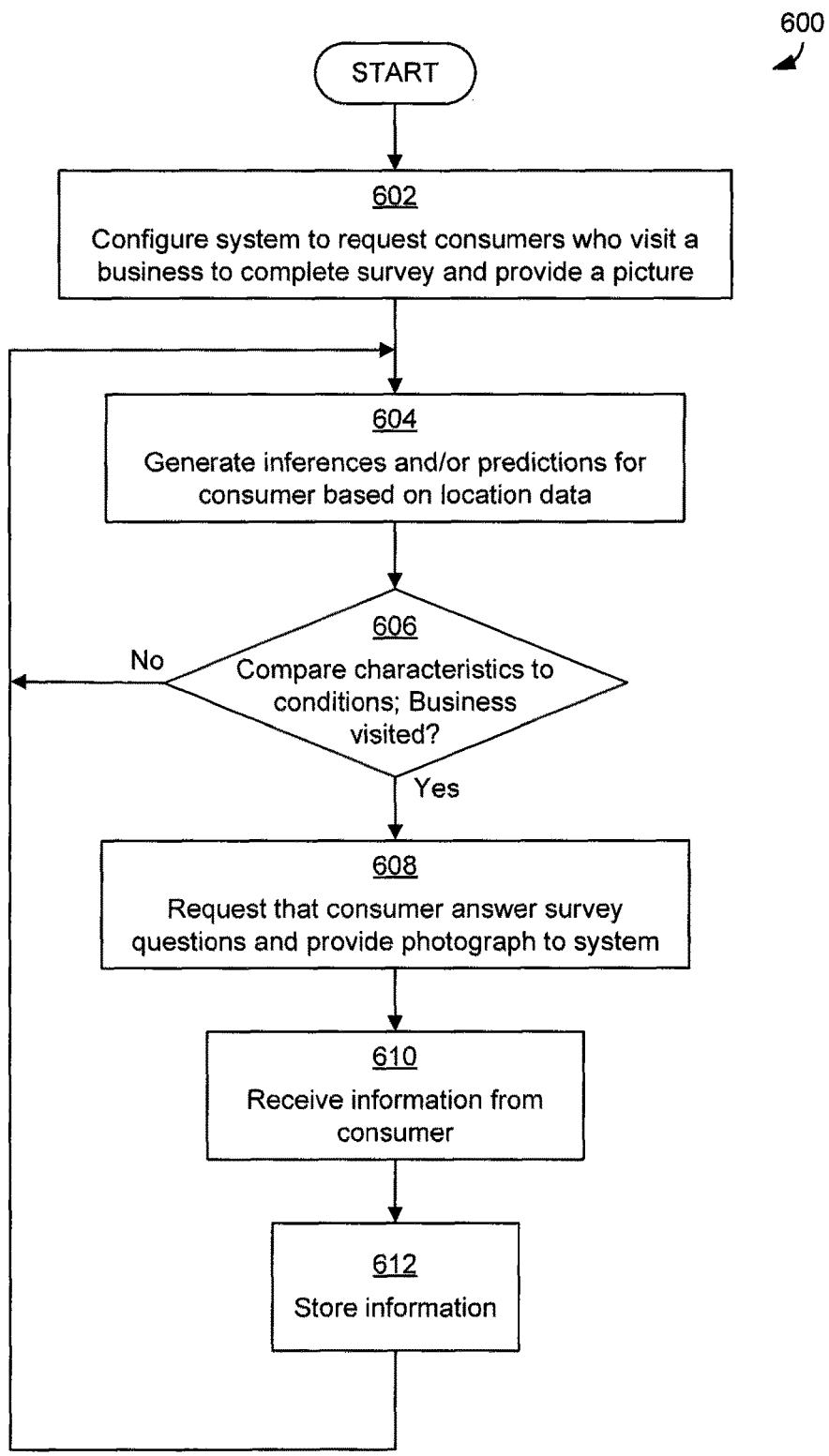
FIG. 6 is a flowchart of an example of issuing a request to a consumer to perform a task in response to an evaluation of location data for the consumer.

FIG. 6 illustrates an example of a process that may be followed by a consumer analytics system for soliciting information from a consumer. As with the process 500 of FIG. 5, prior to the start of the process 600 of FIG. 6, the consumer analytics system may receive registration for multiple consumers, which may include storing information identifying consumers and devices associated with consumers. Once consumers are registered with the system, location data for the consumers is received by the system and may be processed by the consumer analytics system.

The process 600 begins in block 602, in which the consumer analytics system is configured with an action and conditions for the action to be taken by the consumer analytics system. The consumer analytics system may be configured by an administrator. The system may be configured in response to a request by a market researcher for data to be collected from one or more consumers. In the example of FIG. 6, the configuration of block 602 may include configuring the consumer analytics system to take an action that includes prompting a consumer to answer survey questions and provide a photograph to the system. The survey questions may relate to a consumer's opinions with respect to a retail business, reasons for shopping at the retail business, and opinions with respect to a particular product carried by the retail business. The picture may be a photograph of shelves of the retailer holding the particular product. The market researcher may request the picture to determine whether the consumer is able to quickly or conveniently locate the shelf carrying the particular product. Survey questions may include a question relating to whether the consumer was able to locate the shelves for the product, and the picture may also be used by a market researcher to confirm that the consumer actually located the product on the shelves. The configuration of block 602 may also include specifying conditions that, when met, trigger the consumer analytics system to transmit a message to the consumer describing the survey and the desired picture. In the example of FIG. 6, the consumer analytics system may be configured to transmit the message to a consumer when the consumer analytics system determines a behavior characteristic for a consumer indicating that the consumer visited the retail business.

In block 604, location data for a consumer is received by the consumer analytics system and analyzed to generate inferences and/or predictions regarding characteristics of consumers. As part of the analysis of block 604, the consumer analytics system infers one or more behaviors of a consumer, including that the consumer visited the retail business. In accordance with the configuration of block 602, when the consumer analytics system determines the behavior characteristic indicating that the consumer visited the retail business, and determines in block 606 that the behavior characteristic satisfies the condition, the consumer analytics system in block 608 takes the action with which the system is configured. The consumer analytics system, in block 608, transmits a message to a consumer's phone. The message may include any suitable content to solicit information from the consumer. The message may include content regarding the task the consumer is being requested to perform, including a description of the task or an identifier for a location (e.g., a URL for a web server) from which the description can be obtained. The description of the task may include survey questions the consumer is requested to answer and a description of the photograph the consumer is requested to take and provide to the system.

Figure 7:
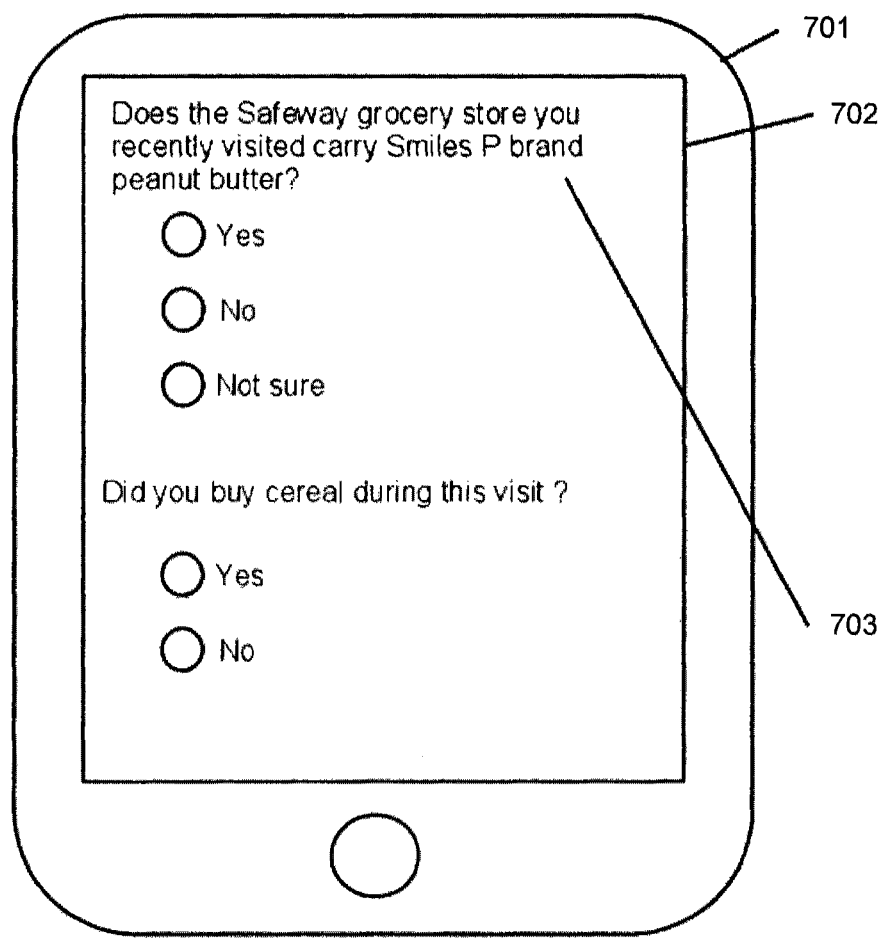
FIG. 7 is an exemplary image of the result of an action which displays two survey questions for a consumer to answer on a device.

Once the message is transmitted to the consumer, the consumer may begin completing the task. The consumer may be presented with any suitable interface for taking a survey as part of completing the task, an example of which is illustrated in FIG. 7. In the example of FIG. 7, a mobile device 701 used by the consumer displays the questions and possible answers of a survey 703 on the device's display screen 702. The mobile device 701 could be a mobile phone, tablet, or other device used by the consumer. The consumer can then answer each question using the device and the responses are sent to the server. The questions and possible answers may be displayed on the device's screen by any suitable software executing on the device. For example, in some embodiments, an application dedicated to collecting location data and interacting with consumer's to collect data from consumers for the consumer analytics system may be executing on the device, and the consumer may interact with that application to complete the survey. It should be appreciated that, while multiple-choice questions are included in the example of FIG. 7, surveys are not limited to including multiple-choice questions. Surveys may additionally or alternatively include open-ended questions that may be completed by a consumer. Additionally, as part of completing the task, the consumer may obtain the photograph requested in the task, which may be done using a camera installed in the device used by the consumer to complete the survey.

In block 610, the responses to the survey questions and the photograph are received by the consumer analytics system from the consumer. The consumer analytics system may receive the responses and photographs in any suitable way, including by receiving them in one or more communications, via one or more communication networks, from the device on which the consumer completed the survey and obtained the photograph. When the data is received, the consumer analytics system may store the information in block 612. The data may be stored in any suitable manner, as embodiments are not limited in this respect. In the example of FIG. 6, the data may be stored in association with a profile for the consumer, and may be associated with information regarding the consumer's interactions with the retail business. For example, the data including the survey responses and the photograph may be stored in association with information identifying the time of day, week, or year the consumer visited the retail business, or an amount of time the consumer spent at the retail business, which may be determined from the location data. As another example, the data may be stored in association with characteristics determined from the consumer's visit and past visits to the retail business, including a frequency of the consumer's visits to the retail business, where the consumer was traveling to when the consumer stopped at the retail business, a purpose of the consumer's trip when the consumer visited the retail business (e.g., shopping for a particular product, or a general shopping trip, or another purpose), other stores visited by the consumer during the same trip that the consumer visited the retail business, or any other information that may be determined by the consumer analytics system from the location data for the consumer and/or from the data provided by the consumer.

Once the data is stored by the consumer analytics system, the process 600 returns to block 604, in which the consumer analytics system processes location data (which may include newly-received location data) to determine characteristics for consumers.

Figure 8:
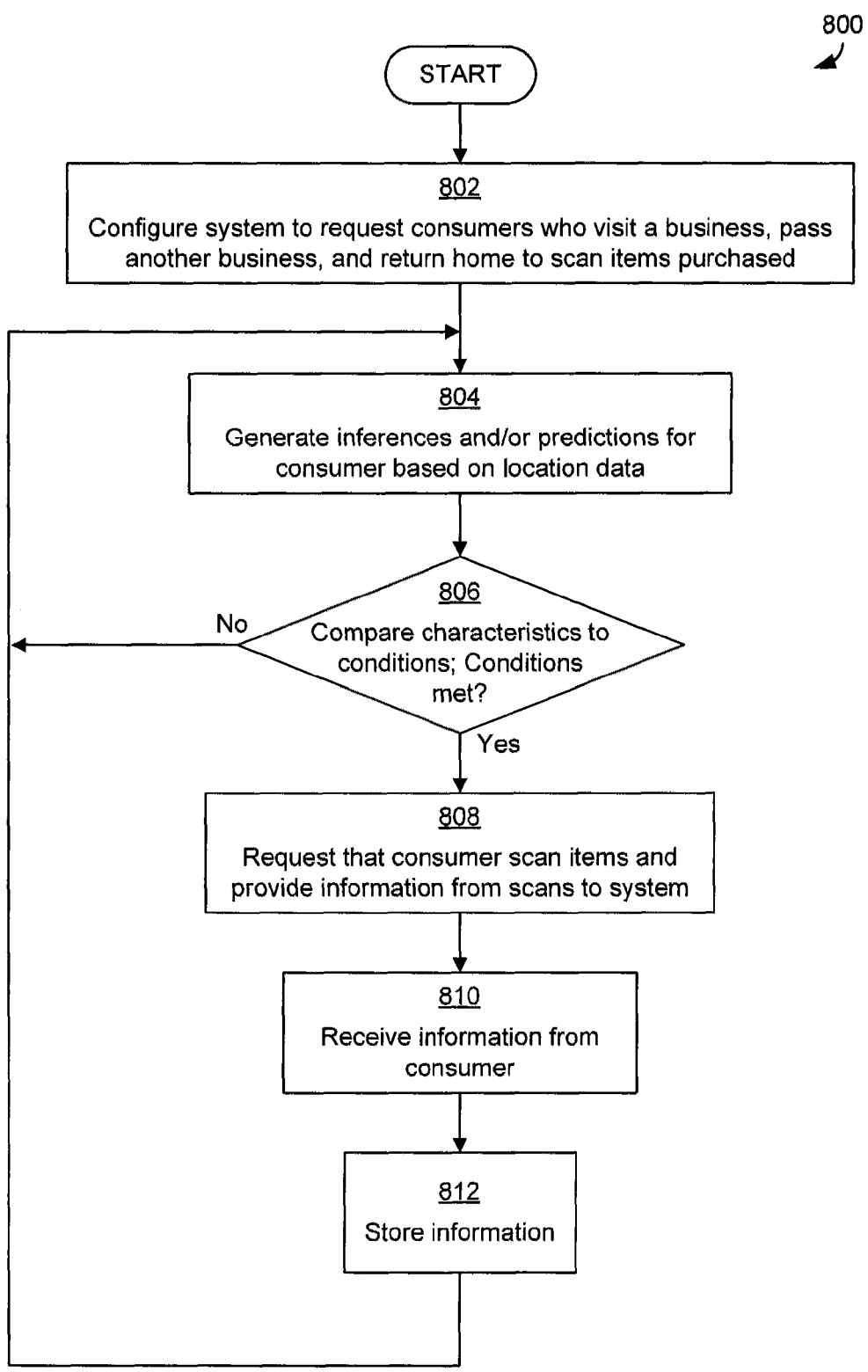
FIG. 8 is a flowchart of another example of issuing a request to a consumer to perform a task in response to an evaluation of location data for the consumer.

FIG. 8 illustrates an example of another process that may be followed by a consumer analytics system for collecting data from a consumer. As with the process 600 of FIG. 6, prior to the start of the process 800 of FIG. 8, the consumer analytics system may receive registration for multiple consumers, which may include storing information identifying consumers and devices associated with consumers. Once consumers are registered with the system, location data for the consumers is received by the system and may be processed by a consumer analytics system of the consumer analytics system.

The process 800 begins in block 802, in which the consumer analytics system is configured with an action and conditions for the action to be taken by the consumer analytics system. The consumer analytics system may be configured by an administrator. The system may be configured in response to a request by a market researcher for data to be collected from one or more consumers. In the example of FIG. 8, the configuration of block 802 may include configuring the consumer analytics system to prompt a consumer to scan products purchased by a consumer during a shopping trip in which the consumer visited to one retail business, but drove past another retail business. A market researcher working on behalf of the retail business not visited by the consumer may desire this information, such as in the case where the business visited by a consumer is a competitor of the business not visited by the consumer. The retail business not visited by the consumer may desire to know what products consumers buy at the competitor that the consumer visited. The configuration of block 802 may also include specifying conditions that, when met, trigger the consumer analytics system to transmit a message to the consumer requesting that the consumer scan the purchased products. In the example of FIG. 8, the consumer analytics system may be configured to transmit the message to a consumer when the consumer analytics system determines behavior characteristics for a consumer indicating that the consumer visited the one retail business, drove past the other retail business, and returned home.

In block 804, location data for a consumer is received by the consumer analytics system and analyzed to generate inferences and/or predictions regarding characteristics of consumers. As part of the analysis of block 804, the consumer analytics system infers one or more behaviors of a consumer, including that the consumer visited the one retail business, drove past the other retail business, and returned home. These characteristics may be determined by the consumer analytics system over a period of time. For example, the consumer analytics system may determine substantially in real time, as the consumer moves, that the consumer has visited one of the retail business and driven past the other retail businesses. At a later time, also substantially in real time with the consumer's movements, the consumer analytics system may determine that the consumer has arrived at the consumer's home. Thus, the consumer analytics system may, in some embodiments, determine the different characteristics that satisfy the conditions of an action at different times. In other embodiments, however, the consumer analytics system may process a set of location data and determine these characteristics at substantially the same time.

The determined characteristics of the consumer may then be compared to conditions of an action in block 806. If the determined characteristics do not satisfy the conditions, the process 800 returns to block 804. However, in accordance with the configuration of block 802, when it is determined in block 806 that the consumer analytics system determined behavior characteristics indicating that the consumer visited the one retail business, drove past the other retail business, and arrived home, the consumer analytics system takes the action in block 808. The consumer analytics system, in block 808, transmits a message to a consumer's phone. The message may include any suitable content regarding the task the consumer is being requested to perform, including a description of the task or an identifier for a location (e.g., a URL for a web server) from which the description can be obtained. In the example of FIG. 8, the description of the task may include a request that the consumer scan the items purchased by the consumer at the retail business visited by the consumer.

The scan requested of the consumer of the products may be any suitable scan. In some cases, the consumer may be requested to scan a bar code (which may be a Universal Product Code (UPC) or Quick Response (QR) Code) or a Near Field Communications (NFC) tag (which may be a Radio Frequency Identification (RFID) tag) for a product and provide to the consumer analytics system the information obtained through the scanning. The information obtained through the scanning may include information identifying the product with which the UPC, QR code, or NFC tag is associated. Thus, by scanning the items, the consumer may obtain an electronically-stored list of items purchased by the consumer. If the consumer's phone includes a bar code or NFC scanner, the consumer may use the phone to scan and provide the information to the consumer analytics system.

In block 810, the data obtained by the consumer (e.g., the list of purchased items) through the scanning is received by the consumer analytics system from the consumer. The consumer analytics system may receive the data in any suitable way, including by receiving the data in one or more communications from the consumer's phone. When the data is received, the consumer analytics system may store the information in block 812. The data may be stored in any suitable manner, as embodiments are not limited in this respect. In the example of FIG. 8, the data may be stored in association with a profile for the consumer, and may be associated with information regarding the consumer's interactions with the retail business that the consumer visited. For example, the data including the list of products may be stored in association with information identifying the time of day, week, or year the consumer visited the retail business, or an amount of time the consumer spent at the retail business, which may be determined from the location data. As another example, the data may be stored in association with characteristics determined from the consumer's visit and past visits to the retail business visited by the consumer, including a frequency of the consumer's visits to the retail business, where the consumer was traveling to when the consumer stopped at the retail business, a purpose of the consumer's trip when the consumer visited the retail business (e.g., shopping for a particular product, or a general shopping trip, or another purpose), other stores visited by the consumer during the same trip that the consumer visited the retail business, or any other information that may be determined by the consumer analytics system from the location data for the consumer and/or from the data provided by the consumer.

Once the data is stored by the consumer analytics system, the process 800 returns to block 804, in which the consumer analytics system processes location data (which may include newly-received location data) to determine characteristics for consumers.

Examples of actions that may be taken by a consumer analytics system to collect data from a consumer have been described above. It should be appreciated, however, that embodiments in which a consumer analytics system may collect data from a consumer are not limited to requesting that consumers carry out any particular task to provide any particular data or type of data. Rather, a consumer analytics system may request that a consumer provide any suitable data to the consumer analytics system. Thus, examples of tasks that a consumer may be asked to complete include:

- Answering questions—message(s) may be sent to one or more consumers requesting that they answer survey questions. The surveys could be delivered via an application running on a mobile device, an application on a desktop or laptop computer, or any other common way of sending a survey. In some implementations, the messages sent to consumers could contain the survey questions themselves.
- Performing a physical action—message(s) may be sent to one or more consumers requesting that they perform some physical action either within the POI or at a separate location. In some implementations this would involve interacting with a POI (e.g. take a coupon from a display within a store and mail it to a specific address) or other people within a POI (e.g. ask a service desk attendant for help, ask another consumer her opinion, etc.).
- Capturing media—actions may include capturing and storing various kinds of electronic media (e.g. photos, video, audio, etc.). In some implementations, an application on the mobile device 201 could automatically capture the media using sensors on the device (e.g. a camera, microphone, etc.). In other implementations, the consumer could be provided with a message requesting her to capture the media.

As mentioned above, it should also be appreciated that embodiments are not limited to soliciting information from consumers. In some embodiments, a consumer analytics system may additionally or alternatively acquire data from one or more data sources external to the consumer analytics system. The data sources external to the consumer analytics system may be sources of electronically-stored data. The consumer analytics system may be able to acquire the data by communicating with the data sources via one or more communication networks, including one or more wide-area networks, such as the Internet.

Figure 9:
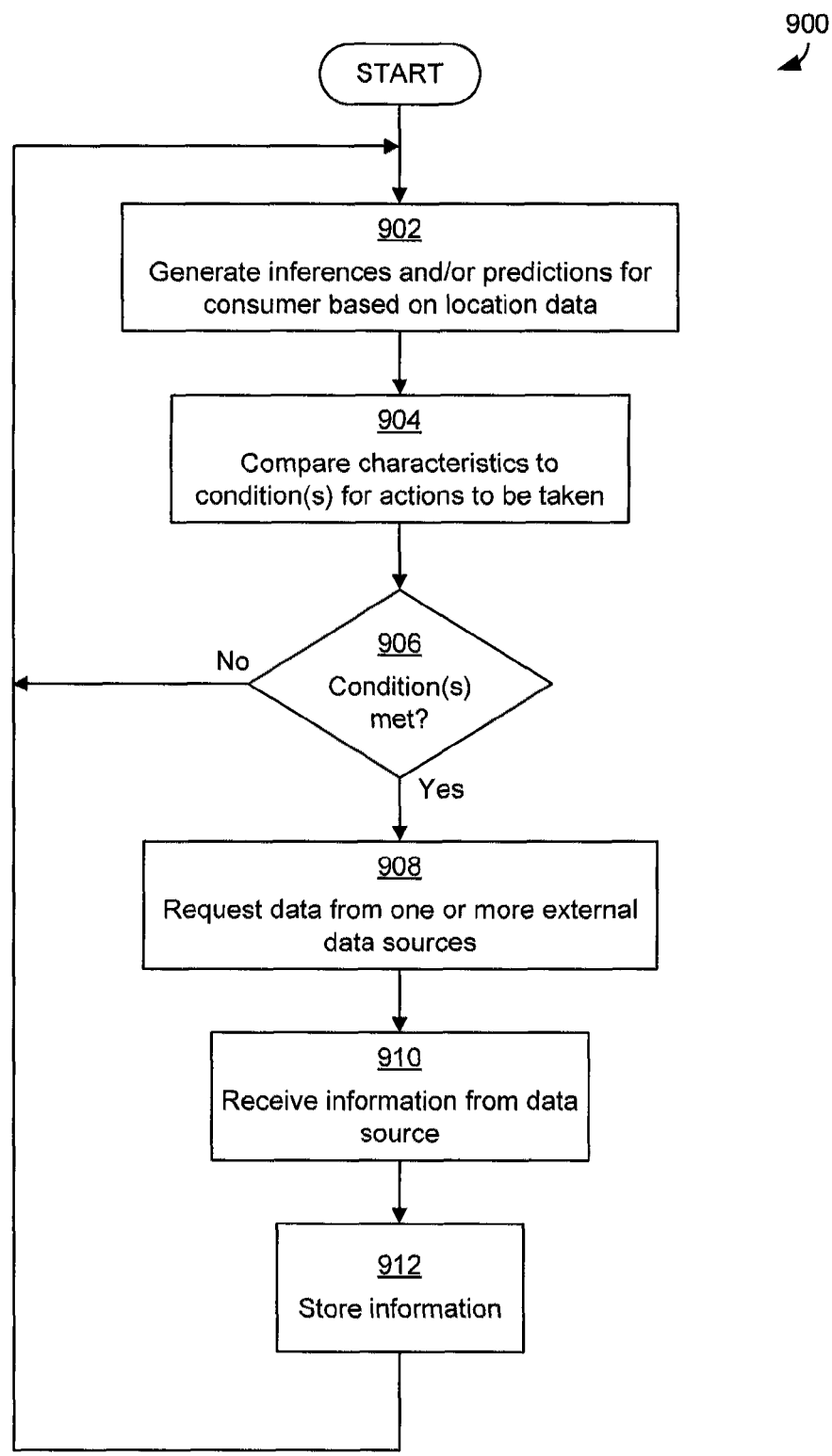
FIG. 9 is a flowchart of an example of a process for requesting data from one or more external data stores in response to an evaluation of location data for the consumer.

FIG. 9 illustrates an exemplary technique that may be performed by a consumer analytics system to collect data from one or more external data sources in response to conditions for the collection being met. Prior to the start of the process 900 of FIG. 9, one or more actions and one or more conditions for triggering the actions are specified in the consumer analytics system, such as using techniques described above in connection with FIG. 2. The consumer analytics system may also receive registration for multiple consumers, which may include storing information identifying consumers and devices associated with consumers. Once consumers are registered with the system, location data for the consumers is received by the system and processed by the consumer analytics system.

The process 900 begins in block 902, in which the consumer analytics system generates predictions and/or inferences of one or more characteristics of one or more consumers based at least in part on the location data for the consumers. The predictions and/or inferences of block 902 may be generated in any suitable manner, including according to techniques discussed above in connection with block 502 of FIG. 5.

In block 904, the consumer analytics system compares one or more characteristics for one or more consumers determined by the consumer analytics system to one or more conditions of one or more actions that may be taken by the consumer analytics system. The characteristics of consumers that are compared in block 904 may include characteristics inferred and/or predicted at any time by the consumer analytics system, including characteristics inferred and/or predicted based on different location data obtained at different times. The comparison of block 904 may be carried out in any suitable manner, including according to techniques discussed above in connection with block 504 of FIG. 5.

In block 906, the consumer analytics system determines whether the characteristic(s) for a consumer satisfy the condition(s) for the system to take an action with which the system is configured. If not, the process 900 returns to block 902, in which the consumer analytics system analyzes location data (which may include newly-received location data) to determine characteristics for consumers. If, however, the condition(s) for an action are met, the consumer analytics system takes the action with which the system was configured. In the example of FIG. 9, the action taken by the consumer analytics system includes collecting data from one or more external data sources. Accordingly, in block 908, the consumer analytics system communicates with the one or more external data sources via one or more communication networks, which may include the Internet, and requests that data stored by the external data source(s) be provided to the consumer analytics system.

Any suitable data may be stored by the external data source(s) and, thus, any suitable data may be requested by the consumer analytics system. Examples of data include data relating to a consumer, a setting, or an environment of a consumer's interactions with a setting.

As an example of data regarding a consumer that may be collected, in some embodiments, the external data sources may include a social networking service storing social networking data, including social networking data provided by the consumer to the social networking service. Embodiments may interact with any suitable social networking service of any type to acquire data from the social networking service. In some implementations, the social networking service may be a text and media social sharing service such as FACEBOOK®, a social location sharing service such as FOURSQUARE®, a social task-assignment service such as SCVNGR®, a gaming service SHADOW CITIES™ by GREY AREA™, a short message distribution service such as TWITTER®, or any other suitable social network. In cases in which data is acquired from a social networking service, the consumer analytics system may, in block 908, retrieve social networking data provided by the consumer to the social networking service. In embodiments that collect social networking data, information regarding a social networking service used by a consumer may be collected as part of registering a consumer with the consumer analytics system. Information about the social networking service may include an identification of the service, a consumer's username or other identifier for the service, and any other suitable information. Social networking data may be relevant to a market research study because the information may identify behaviors and/or preferences of a consumer. For example, if a consumer mentions a commercial entity, product, or service in social networking data provided by the consumer, the consumer analytics system may be able to determine behavior and/or preference characteristics for the consumer. Social networking data provided by the consumer to the social networking service during a time period that corresponds to a time period for which the consumer was at a setting may be of interest to market researchers, as the social networking data may relate to the consumer's experiences at the setting. As another example of social networking data, if a consumer who was detected to have visited a setting posts information to a social networking service identifying places visited by the consumer, the consumer analytics system may be able to check the setting identified by the consumer analytics system based on the location data against the places listed by the consumer to confirm that the consumer visited the setting identified by the consumer analytics system. In embodiments in which a consumer analytics system collects social networking data, any suitable social networking data, including textual information and/or media information (e.g., images) may be collected by the system.

As another example of data relating to a consumer that may be obtained from external data sources, information identifying a manner in which a consumer uses a mobile phone or other device may be collected. Such information may be collected from an application executing on a device that performs "on-device metering" (ODM), may be collected from an operator of a cellular network by which the device communicates, or from any other suitable entity. The information regarding the consumer's device use may include information on which applications are opened and at what time; call histories; logs of text messaging and/or multimedia messaging; website/email activity; and any other information about activities of the consumer regarding the device. Applications that are executed on a device operated by a consumer may include applications related to social networking services.

As another example of data relating to a consumer that may be obtained from external data sources, purchasing data may be obtained by a system. In some embodiments a consumer analytics system may be configured to combine location data for a consumer with the consumer's purchasing activity. Combining location data for a consumer with the consumer's purchasing activity may enable analysis of characteristics of consumers at a finer grain. For example, a brand manager may be interested in data collected from consumers who visited a retail business, but may be more interested in data collected from consumers who visited the retail business and actually purchased a product of the brand of interest. Alternatively, a brand manager may be interested in comparing data collected from consumers who did not purchase a product of the brand to consumers who did purchase a product of the brand. Accordingly, in some embodiments the consumer analytics system may be configured to communicate with one or more external data sources to determine information about a consumer's purchasing activity. For example, the consumer analytics system may communicate with a data store of information about a consumer's purchases that includes data on which products the consumer purchased, how much each product cost, the time of day for each purchase, whether or not the item was on sale, the barcode or product photograph or any other unique product identifier, and information about how the product(s) were paid for. In some embodiments, a consumer analytics system may collect data about the consumer's purchasing activity from a household consumer panel, such as the Nielsen-IRI National Consumer Panel or the Kantar Retail WorldPanel. These panels invite consumers to scan the barcodes of every item they purchase out of home and provide the foregoing list of information about the purchase. As another example, information about a consumer's purchasing activity may be collected by the consumer analytics system from one or more data stores associated with the consumer's credit and/or debit card accounts.

Data that is collected from external data sources may additionally or alternatively include information regarding a setting, such as information regarding a commercial entity. For example, advertisements, sales or promotions, catalogs, circulars, or other information regarding marketing efforts of a commercial entity may be collected. Information regarding marketing efforts of a commercial entity may be relevant in some cases because the marketing information may provide context for a consumer's visits to the commercial entity, such as when a particular product is on sale and a consumer indicates (such as in response to a survey, as discussed above) that the consumer visited the commercial entity primarily to purchase the product. As another example of information regarding a setting, data collected by loyalty program for a commercial entity may be collected by the consumer analytics system. A loyalty program for a commercial entity may be a program established by a commercial entity for tracking and interacting with customers of the commercial entity. One example of a loyalty program is a frequent-shopper program for a commercial entity. A data store for a loyalty program may store information identifying a manner in which a consumer interacts with a commercial entity, including a log of transactions between the consumer and the commercial entity that may identify products purchased and times at which the products were purchased, and/or coupons or other discounts offered to the consumer as part of the program.

Data that relates to both a consumer and a setting may also be collected in some embodiments from an external data store. For example, data indicating a movement and/or behavior of a consumer inside a setting may be collected by the consumer analytics system from an external data source. The consumer analytics system may be configured to combine location data that is sufficiently accurate to determine settings visited by a consumer (e.g., GPS data) with more precise location data that identifies how the consumer moves around within a given setting, such as how the consumer moves around indoors at a setting. Indoor location data relating to a consumer's movements at a commercial entity may be derived using technologies other than GPS, such as technologies offering indoor location accuracy above that available using GPS or other satellite-based system. Examples of location-determining technologies that may be used include RFID, video, audio, and infrared technologies. When the consumer analytics system obtains from an external data source indoor location data for a consumer, the consumer analytics system may process the data to identify a consumer's path through the setting, including dwell times in certain aisles of a store or in front of certain product displays or signage of store. Indoor location data, when processed, may also indicate the amount of time a consumer spent waiting at the checkout register of a store, and/or various metrics to indicate how busy a store is at a given time of day.

Indoor location data may be relevant to market researchers. As an example, by combining location analytics with in-store location behaviors, it may be possible to segment consumers' out-of-store activity according to the specific categories of product that are of interest to the market researcher. It is also possible to segment consumers and data collected from consumers (e.g., responses to surveys) according to how consumers move around a store. For example, a retailer may be interested only in the customer satisfaction metrics for consumers who are required to wait at the checkout register for more than 10 minutes because the store is exceedingly busy. As a second example, a brand manager may be interested in the in-the-moment mobile survey responses only of consumers who exhibited dwell-time within the aisle of a store that showcases a given product category of interest.

Data that is collected from external data sources may additionally or alternatively include information regarding an environment for interactions between a consumer and a setting. Environmental information may include any information regarding circumstances that may affect commercial activity, such as information regarding circumstances that may affect a monetary transaction or a potential monetary transaction between a consumer and a commercial entity. The circumstances may not have a direct relationship to the consumer or to the commercial entity. For example, weather data may be collected in some embodiments. Weather information may affect transactions because some consumers may stay home during a rainstorm, heat wave, or other weather event, while some consumers may spend more time in a shopping mall or movie theater during such a weather event, or make emergency trips to stores in advance of a weather event. Gas prices are another example of environmental information that may be collected in some embodiments. Gas prices may affect transactions because some consumers may stay closer to home or make fewer trips when gas prices are high, and conversely may make more trips or longer trips when gas prices are low.

Any one or more of these examples of types of data, or any other suitable data, may be collected from external data sources by a consumer analytics system in block 908. In response to a request for data transmitted by the consumer analytics system in block 908, in block 910 the consumer analytics system may receive the data as one or more communications received via a network, including a wide-area network, from the external data store. In block 912, the system stores the data. The data may be stored in connection with a profile for the consumer or may be stored in any other suitable manner. Once the information is stored, the process 900 continues to block 902, in which the consumer analytics system processes location data (which may include newly-received location data) to determine characteristics for consumers.

As a result of the process 900, the consumer analytics system stores data received from external data sources. The data received from the external data sources may be retrieved and provided to any suitable entity, including market researchers, along with any other results from a market research study such as consumer characteristics. In some embodiments, data received from the external data sources may be analyzed by the consumer analytics system to determine characteristics for the consumer. For example, if social networking data or text message sent by a consumer includes a mention of a commercial entity or product, that data may be analyzed to generate predictions and/or inferences of characteristics of the consumer with respect to the commercial entity or product.

Examples of data that may be collected by a consumer analytics system from one or more external data sources have been described above. It should be appreciated, however, that embodiments in which a consumer analytics system may collect data from external data sources are not limited to collecting any particular data or type of data. Rather, a consumer analytics system may collect any suitable data. Thus, examples of data that a consumer analytics system may collect from one or more external data sources include:

Data related to a consumer: As an example, when the system discovers a consumer has gone hiking, information the consumer had published on a social networking website (e.g. Facebook.com, Friendster.com, hi5.com, Orkut.com, etc.) can be collected. As this data collection event is triggered close to the time the consumer performed the behavior of interest, the collected data may be tied to the event.

Data related to a consumer behavior: As an example, if the system discovers a consumer has been line dancing at a specific venue in Austin, Tex., social media websites could be searched for any text or media published by users near the consumer's location and associated with line dancing. This method could be used to calculate how common the given behavior is (e.g. how many other people are line dancing in Austin), or to associate this consumer with other consumers, places, or locations, or other types of measurements.

As mentioned above, embodiments are not limited to taking data collection actions when consumer characteristics meet conditions for the consumer analytics system to take an action. In some embodiments, rather than an action being the collection of data when consumer characteristics meeting conditions, a consumer analytics system may act to transmit data when consumer characteristics meet conditions for the action to be taken.

Figure 10:
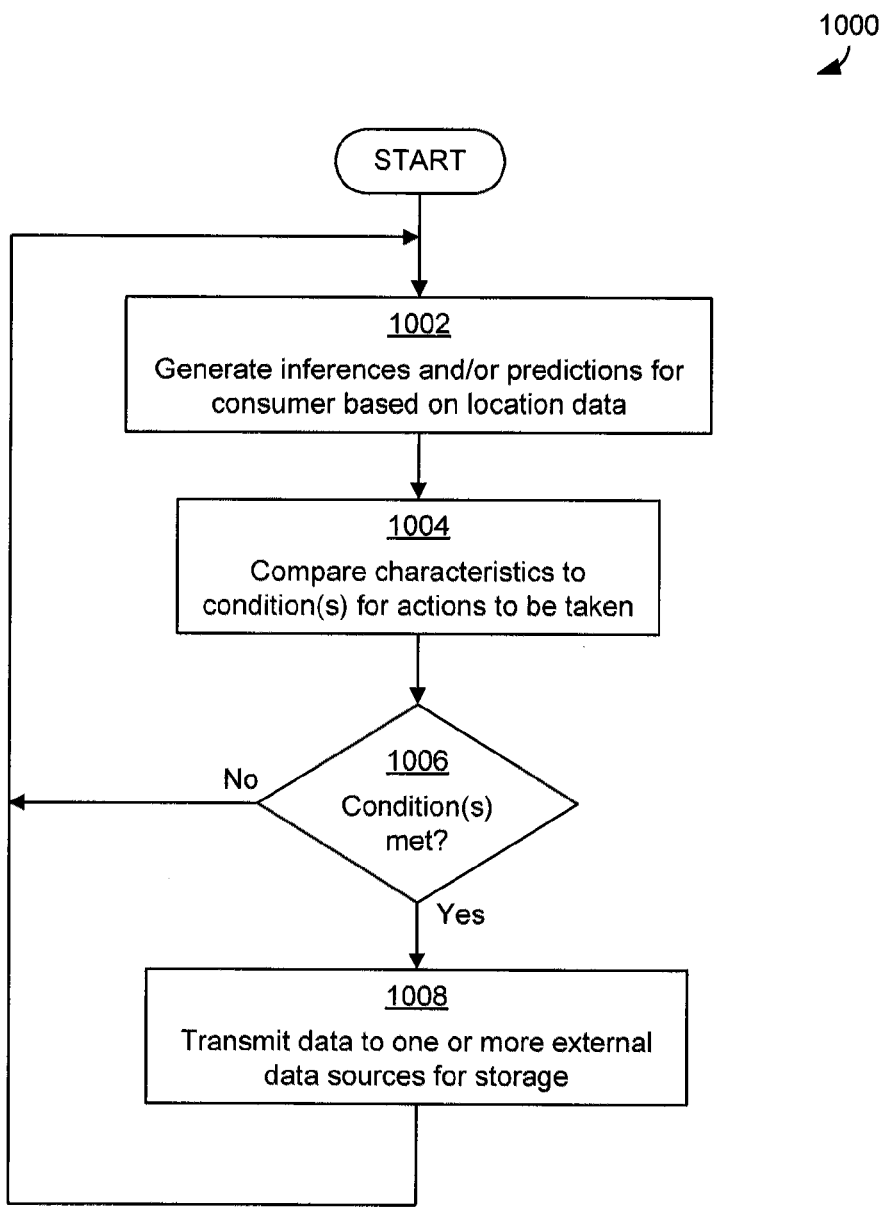
FIG. 10 is a flowchart of an example of a process for transmitting data to one or more external data stores in response to an evaluation of location data for the consumer.

FIG. 10 illustrates an exemplary technique that may be performed by a consumer analytics system to collect data from a consumer in response to conditions for the collection being met. Prior to the start of the process 1000 of FIG. 10, one or more actions and one or more conditions for triggering the actions are specified to the consumer analytics system, such as using techniques described above in connection with FIG. 2. The consumer analytics system may also receive registration for multiple consumers, which may include storing information identifying consumers and devices associated with consumers. In some embodiments, the information identifying consumers and devices may not personally identify consumers, but may uniquely identify consumers in the consumer analytics system. Once consumers are registered with the system, location data for the consumers is received by the system and processed by the consumer analytics system.

The process 1000 begins in block 1002, in which the consumer analytics system generates predictions and/or inferences of one or more characteristics of one or more consumers based at least in part on the location data for the consumers. The predictions and/or inferences of block 1002 may be generated in any suitable manner, including according to techniques discussed above in accordance with block 502 of FIG. 5.

In block 1004, the consumer analytics system compares one or more characteristics for one or more consumers determined by the consumer analytics system to one or more conditions of one or more actions that may be taken by the consumer analytics system. The characteristics of consumers that are compared in block 1004 may include characteristics inferred and/or predicted at any time by the consumer analytics system, including characteristics inferred and/or predicted based on different location data obtained at different times. The comparison of block 1002 may be carried out in any suitable manner, including according to techniques discussed above in accordance with block 504 of FIG. 5.

In block 1006, the consumer analytics system determines whether the characteristic(s) for a consumer satisfy the condition(s) for an action to be taken. If not, the process 1000 returns to block 1002, in which the consumer analytics system analyzes location data (which may including newly-received location data) to determine characteristics for consumers. If, however, the condition(s) for an action are met, the consumer analytics system takes the action. In the example of FIG. 10, the action taken by the consumer analytics system is transmitting data to one or more external data stores. The external data stores may store data electronically, and the consumer analytics system may be able to transmit data to the data stores electronically, via one or more communication networks, including a wide-area network such as the Internet. The external data stores may store any suitable information, including information regarding a consumer and/or information regarding a setting.

In some embodiments, a consumer analytics system may transmit data to a data store of information regarding a consumer that is a social networking service storing social networking data, including social networking data provided by the consumer to the social networking service. In such a case, the consumer analytics system may, in block 1008, transmit social networking data to the social networking service. In embodiments that transmit social networking data, information regarding a social networking service used by a consumer may be collected as part of registering a consumer with the consumer analytics system. Information about the social networking service may include an identification of the service, a consumer's username or other identifier for the service, and any other suitable information. Information that is transmitted to the social networking service may include any suitable information transmitted on behalf of any suitable party. In some embodiments, the consumer analytics system may transmit information to the social networking service on behalf of the consumer. For example, when the consumer is detected to have visited a setting, the consumer analytics system may transmit information to the social networking service, on behalf of the consumer, indicating that the consumer was at the setting. When the information is received by the social networking service, a profile for the consumer may be updated to reflect that the consumer was present at the setting. As another example of information that may be transmitted, the consumer analytics system may transmit data to a social networking service on behalf of a commercial entity. The information transmitted on behalf of the commercial entity may include a message directed to the consumer via the social networking service that would appear to come from the commercial entity, thanking the consumer for visiting or providing any other suitable information. As another example, the information transmitted on behalf of the commercial entity may include a message that is not directed to any particular consumer, but is posted to the social networking service in response to consumer characteristics indicative of consumer behavior. For example, an action with which the consumer analytics system may be configured may be posting a message regarding how busy a commercial entity is when multiple consumers are detected as visiting the commercial entity. When the information is transmitted to the social networking service on behalf of the commercial entity, a profile for the commercial entity maintained by the social networking service may be updated to reflect the transmitted information. As another example of information that may be transmitted, information may be transmitted to the social networking service on behalf of the system and added by the social networking service to a profile maintained by the social networking service for the system.

As another example of information that may be transmitted to a data store associated with a consumer, in some embodiments a consumer analytics system may transmit coupons, descriptions of specials, or other promotional material to a consumer. The information may be transmitted by the consumer analytics system to a data store associated with the consumer, such as by transmitting the information to an e-mail account for the consumer or in the form of a message to be received by a device operated by the consumer.

As another example of the type of data that may be transmitted, in some embodiments a consumer analytics system may transmit data to a data store of information regarding a setting. A data store of information regarding a setting may include information regarding a commercial entity, such as information regarding a loyalty program for the commercial entity. A data store for a loyalty program may maintain information on coupons or discounts to offer to consumers, which may be distributed to consumers in accordance with the loyalty program. In some embodiments, the consumer analytics system may, when characteristics of a consumer satisfy conditions for an action with which the system is configured, transmit information to the data set for the loyalty program indicating that a consumer should be presented with a particular coupon or discount.

Any one or more of these examples of types of data, or any other suitable data, may be transmitted by the consumer analytics system in block 1008. Once the data is transmitted by the system, the process 1000 continues to block 1002, in which the consumer analytics system processes location data (which may include newly-received location data) to determine characteristics for consumers.

Triggering Actions Based on Predicted Behaviors or Behaviors of Multiple or Other Consumers In examples given above, a consumer analytics system is described as taking an action in response to inferring behavior characteristics of one consumer relating to behaviors in which the consumer previously engaged or is engaging. It should be appreciated that embodiments are not limited to taking action based on inferred characteristics relating to current or past behaviors of a consumer. It should also be appreciated that embodiments are not limited to taking action based on characteristics of only a single consumer.

A consumer analytics system may determine characteristics of consumers by inferring the characteristics and/or by predicting characteristics. A consumer analytics system may take action based on either or both of inferred characteristics and predicted characteristics of one or more consumers. Thus, as an alternative to or in addition to triggering actions based on discovered behaviors of consumers, actions of a consumer analytics system may also be triggered by behaviors in which consumers are predicted to engage based on historical data. This can allow the system to trigger actions before a certain behavior is expected to take place.

For example, a researcher may be interested in better understanding how a consumer chooses which shampoo to buy. By processing a given consumer's location data while the consumer is moving, a probabilistic model can be created to (1) determine the stores the consumer shops at which carry the shampoo, and (2) given her most recent data, how likely she is to be on her way to a store that carries shampoo. When the model detects that there is a high probability that she is on her way to a store that carries shampoo, a "collect shampoo sentiment" action could be triggered. This could send the consumer a message (as an SMS, email, alert in an application, etc.) which could prompt her to answer survey questions to understand her mindset as she enters the store. In addition, other data sources, like transactions recorded for a loyalty program, "Checkins" to social location-based applications, etc., could be polled to pull in more information.

As another example, when the consumer analytics system determines that some or many consumers included in a group of consumers are engaging in a behavior, the consumer analytics system may predict that other consumers included in the group may engage in that behavior soon or in the future. A group of consumers may be defined in any suitable manner, including according to one or more characteristics that are shared by consumers of the group. For example, a group of consumers may be consumers who are customers of a particular store or who live in a particular area. When the consumer analytics system detects from analyzing location data for some consumers included in a group that those consumers are engaged in a particular behavior, the consumer analytics system may infer a behavior characteristic for those consumers and may predict the same or a similar behavior characteristic for other consumers of the group. Based on these predicted attributes for the consumers, the consumer analytics system may take an action. For example, a group of consumers that share the behavior characteristic of being customers of a retailer having locations across the United States may be monitored by the consumer analytics system. The system may determine that many consumers of the group who also share the identity characteristic of living in the Eastern United States time zone are visiting the retailer on a particular morning. The system may predict, based on this behavior of the Eastern consumers, that consumers of the group who share the identity characteristic of living in the Pacific time zone will visit the retailer once it is morning in the Pacific time zone, and may take an action based on this prediction. For example, the consumers may be provided with a survey based on the predicted behavior characteristic.

In addition, conditions for an action to be taken by the consumer analytics system may be based on characteristics for more than one consumer. For example, a condition for an action may specify that the action is to be taken when a characteristic is inferred or predicted for multiple consumers, such as more than a threshold number of consumers.

Feedback Loop: Data from Actions Optimizing which Actions are Triggered in the Future In some embodiments, conditions associated with an action with which the consumer analytics system is configured may be changed over time. For example, the system may optimize which actions should be triggered for which consumers based on prior actions. In addition, the system may have a feedback loop: as actions trigger collections more data (either from the consumer or other data sources), the resulting data may be fed back into the system to adjust conditions that determine when a given action is triggered.

For example, if a market researcher is interested in consumer sentiment on a given product, at a start of a market research study, a condition for a survey action may be defined such that every consumer who is determined by the consumer analytics system as having a high likelihood of going to a store which carries the product may be surveyed. The surveys can be used to determine characteristics of consumers who actually buy the product. Conditions for the survey action may then be changed such that future surveys can be targeted at only consumers who have characteristics matching those likely to buy the product. For example, demographic or preference characteristics may be determined for consumers who buy the product may be determined. Conditions for the action may then be set such that consumers who have the demographic or preference characteristics and are determined to have the behavior characteristic of being likely to visit a store that carries the product may be surveyed.

Feedback Loop: Adjusting a Visit Detection Process Based on Collected Data

A visit detection process that may be used in some embodiments to match consumer location data to one or more settings, including one or more points of interest, is discussed above in connection with FIG. 4. The visit detection process is described above as identifying settings by comparing a location indicated by location data to a definition of settings known to the visit detection process, such as definitions of points of interest of a point of interest data set. As discussed above, the definition of a setting may include information identifying the setting and a category of the setting, a location polygon identifying boundaries of the setting, and information indicating operational hours of the setting. In some embodiments, a consumer analytics system may be able to edit a definition of a setting based on information received in response to actions taken by the consumer analytics system. Editing the definition of a setting may form a part of adjusting a visit detection process of the consumer analytics system based on the information received in response to the actions taken by the consumer analytics system.

Figure 11:
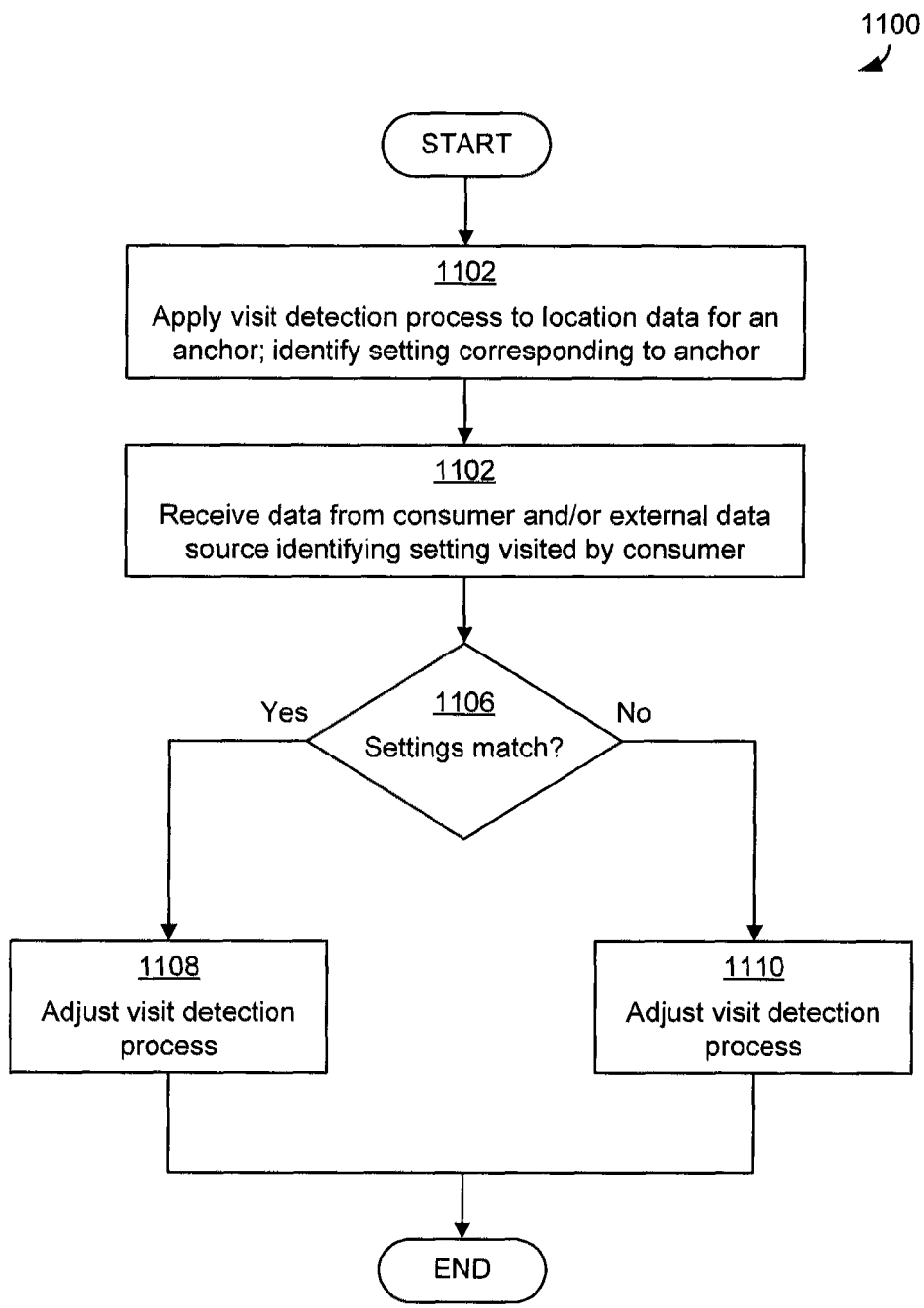
FIG. 11 is a flowchart of an example of a process for adjusting a visit detection process based on information received from a consumer and/or an external data source identifying a setting visited by a consumer.

FIG. 11 illustrates an example of a process that may be carried out by a consumer analytics system to adjust a visit detection process used by the consumer analytics system. Prior to the start of the process 1100 of FIG. 11, a consumer analytics system may be configured with a visit detection process and point of interest data set. The process with which the system is configured may be the process described above in connection with FIG. 4.

The process 1100 begins in block 1102, in which the consumer analytics system applies the visit detection process to location data obtained for a consumer. The visit detection process may be applied in block 1102 in any suitable manner, including as discussed above in connection with FIG. 4. In applying the visit detection process in block 1102, the consumer analytics system attempts to identify a setting corresponding to a location indicated by the location data for the consumer. The consumer analytics system may, in block 1102, identify a setting or produce information indicating that the setting could not be identified.

Based on the location data for the consumer, the consumer analytics system may take one or more actions, as discussed above. Actions taken by the consumer analytics system may include collecting data from a consumer and/or from one or more external data sources. Data collected from the consumer or from an external data source may include information identifying a place visited by the consumer that corresponds to the location indicated by the location data evaluated in block 1102. For example, a survey sent to a consumer may request that the consumer identify the place visited by the consumer, and the consumer may identify the place in response. As another example, a consumer may provide to a consumer analytics system, without prompt, an indication that the consumer is present at a location that the consumer analytics system should match to a setting, such as by providing the consumer analytics system with an indication that the consumer is at a retail store. In response, the consumer analytics system may obtain information related to the setting corresponding to the consumer's location, such as by prompting the consumer to identify the setting. As another example of a way in which the consumer analytics system may receive an indication of a setting visited by a consumer, data collected by a consumer analytics system from an external data source may include purchasing data that may indicate a place at which a consumer made a purchase and may include information about a product or service purchased by the consumer. As another example, data collected by the consumer analytics system from an external data source may include social networking data that may identify a place visited by the consumer. Accordingly, in block 1104, the consumer analytics system receives from the consumer or the external data source a secondary indication of the setting visited by the consumer.

In block 1106, the consumer analytics system compares the setting identified through the visit detection process in block 1102 and the setting identified in the secondary indication received in block 1104 to determine whether the settings are the same or different. If the consumer analytics system determines that the settings are the same, then the consumer analytics system may continue to block 1108. If, however, the consumer analytics system determines that the settings are different, or in the case that the visit detection process was unable to identify a setting in block 1102, the consumer analytics system may continue to block 1110.

In block 1108, in response to determining that the setting identified by the visit detection process in block 1102 matches the setting identified in the second indication received in block 1104, the consumer analytics system may determine that the location visited by the consumer has been confirmed to be the setting. In response to determining that the location visited by the consumer has been confirmed to be the setting, the consumer analytics system may adjust a visit detection process. The adjustment to the visit detection process may be done to increase a likelihood that the location data would be matched to the setting again in the future. The location data that is used to adjust the visit detection process may be any suitable location data. In some embodiments, the location data may be one or more units of location data on which an anchor, which was determined to correspond to the setting, was determined. In other embodiments, the location data may be location data for an anchor calculated from multiple units of location data, such as a mean location determined from multiple units of location data that make up a cluster of location data for an anchor.

In some embodiments, adjusting the visit detection process may include adjusting a definition of the setting. For example, a polygon defining the boundaries of the setting may be adjusted based on the location data from which the consumer was determined to have visited the setting. The polygon may be adjusted in the case that the location data indicates a location near the edges of or even outside of the polygon. In such a case, the polygon may be edited such that the location indicated by the location data falls within the polygon. As another example of an adjustment that may be made to the definition of a setting, if a definition of a setting includes operating hours of the setting, the hours may be adjusted. In particular, if a time at which the location data was obtained falls outside of the operating hours of the setting indicated by the definition of the setting, the operating hours may be adjusted to include the time at which the location data was obtained. As another example of an adjustment that may be made to the definition of a setting, if a definition of a setting includes an indication of one or more categories of the setting, the category(ies) may be adjusted. A category of a setting may be defined in any suitable manner and with any suitable degree of specificity, as embodiments are not limited in this respect. In some embodiments, a category of a business that sells men's clothing may be defined as "retail store," while in other embodiments a category may be defined as "clothing store" or "men's clothing store." If data collected by the consumer analytics system indicates that a behavior of the consumer at the setting is inconsistent with the category indicated by the definition for the setting, the category may be adjusted. For example, if purchasing data for a consumer indicates that the consumer purchased women's clothing at a setting for which the category is indicated to be "men's clothing store," the category may be adjusted to additionally include (or alternatively include) "women's clothing store."

In addition to or as an alternative to adjusting a definition of the setting, one or more thresholds of the visit detection process may be adjusted. As discussed above, as part of determining whether a consumer visited a setting, a consumer analytics system carrying out the visit detection process may determine a likelihood that a cluster of location data corresponds to a setting. The calculated likelihood may then be compared to a threshold and, if the likelihood exceeds the threshold, the cluster of location data may be determined to correspond to the setting. In some embodiments that adjust a visit detection process, the threshold to which the likelihood is compared may be adjusted. For example, in block 1108, the threshold may be lowered in response to determining that the location has been confirmed to match the setting. By lowering the threshold, the visit detection process may be more likely to match the location data to the setting.

Once the visit detection process has been adjusted in block 1108, the process 1100 ends.

If, however, the consumer analytics system determines in block 1106 that the setting identified by the visit detection process does not match the setting identified in block 1104, or if a setting was not identified by the visit detection process, then the consumer analytics system may adjust the visit detection process in block 1110. The adjustment of block 1110 may include adjustments similar to the adjustments of block 1108. For example, when the visit detection process erroneously matches location data to a setting, a threshold associated with the setting may be raised such that the visit detection process is less likely to match location data to the setting in the future. As another example, adjustments may be made to the polygon of a setting in block 1110, such that the polygon may include a location detected for the consumer when the consumer visited the place. However, in some embodiments, the consumer analytics system may not adjust the polygon based on a single data point in block 1110. The adjustment of block 1110 is made in response to detecting a mismatch between the setting identified in block 1102 and the setting identified in block 1104. The basis of the discrepancy may not be known, however. The location data and/or the setting identified in block 1104 may be erroneous. It may be undesirable to adjust the visit detection process based on erroneous data. Because the location data on which the visit detection process operated to produce the setting of block 1102 or the setting identified in block 1104 may not be reliable, an adjustment may not be made only on the basis of that data. Accordingly, in some embodiments in which the consumer analytics system adjusts the polygon, the consumer analytics system may do so on the basis of multiple units of location data for which secondary indications indicate that the location data corresponds to a setting. A similar adjustment may be made with respect to operating times of a setting and/or category of a setting, in embodiments in which a definition of a setting includes an indication of operating times and/or category.

Adjustments to a data set of settings that may be recognized by a visit detection process may also be made in some embodiments. To adjust the data set, settings may be added and/or removed from the data set. For example, when multiple units of location data are received from consumers and indicate the same general location that a visit detection cannot match to a setting, this may be indicative of a new setting that may be added to the data set. When the consumer analytics system identifies that multiple units of location data indicating a same general location are not matched to a setting, but secondary indications for these units of location data are consistently indicating the same setting visited by the consumers, the consumer analytics system may prompt a consumer and/or an administrator to input data regarding this potential new setting. The input data may include some or all of the data defining the setting in the data set, including any of the examples of data defining a setting that were discussed above. Similarly, if the visit detection process consistently matches location data for a location to a setting, but secondary indications for the location indicate another setting, this may indicate that a setting at the location has changed. In response to making this detection, the consumer analytics system may request that a consumer and/or an administrator provide information identifying whether a previous setting has closed and should be removed from the data set and/or whether a new setting has opened and should be added to the data set. If a new setting is to be added to the data set, then the consumer and/or administrator may be prompted to input data regarding the new setting, including any of the examples of data defining a setting that were discussed above.

Once the consumer analytics system performs the adjustment of block 1110, the process 1100 ends.

As a result of the process 1100, the visit detection process of a consumer analytics system is changed. The change in the visit detection process may result in a visit detection process that is capable of detecting settings that the process was not previously capable of detecting, no longer capable of detecting settings that the process was previously capable of detecting, and/or more precise in its detection of settings visited by consumers.

Reporting

The results of all of the information created from consumer feedback and opinions, location data, and any other data sources from which data can be collected can be presented in a software system which allows for easy analysis and the ability to understand and evaluate the data. The results may be stored in a database (such as a SQL-based or OLAP DBMS) that may allow for easy exploration of the results by filtering results of the survey responses for each consumer, including according to behaviors that have been determined for each consumer, or allow exploration of related data that has been added to the system, such as by being retrieved from one or more external data sources. In addition, various types of mathematical aggregation (e.g. sum, median, average, standard deviation, etc.) can be computed and displayed for each type of data that may be stored.

Example Use Case: Shopper Marketing Measurement

In this example, a consumer analytics system can be used to allow marketing analysts to understand how effective their shopper marketing budget is being deployed inside stores.

"Shopper marketing" can be defined as "brand marketing in a retail environment." It includes things like special promotions, endcaps, in-store TV spots, promotional banners/signage/displays, positioning in store circulars, etc. Research has shown that 70% of brand selections are made by consumers in store, so vendors of consumer-packaged goods (CPGs) are increasingly focusing their efforts on in-store shopper marketing.

In some embodiments, a consumer analytics system operating according to techniques described herein may be used to gauge impact/effectiveness/recall/awareness/reach of shopper marketing. Even though a CPG vendor may have a unified shopper marketing campaign across retailers, each retailer may to deploy that campaign differently. It may therefore be difficult to gauge the impact across retailers or even within different stores of the same retailer.

Conventional approaches to determining impact of shopper marketing may be inadequate. For example, one conventional way to gauge impact is by looking at sales figures from a panel of consumers who agree to manually enter the products they buy or from transaction logs. This may be inadequate because each sale is the result of many different types of advertising (TV, online, OOH, in-store, etc.). This also misses the impact of competitors' advertising on purchasing decisions. As another example, another way to get a handle on shopper marketing impact is the shop-along, in which a shopper is accompanied on a shopping trip by a market researcher. Shop-alongs can be very expensive and often can only reach one or two stores, and may also require permission from the store owners. Obtaining permission can take a prohibitively long time, and some stores won't ever allow shop-alongs (e.g., ULTA® Beauty Stores, who have been rated best-in-class for beauty products and reportedly won't collaborate with any market research firms).

A consumer analytics system of one embodiment, however, may be advantageous in this circumstance. The system may first collect location data from a set of consumers (a "panel"). This location data may be used by the system to build a profile for a consumer and also to allow the system to discover when a consumer visits one of the stores which are of interest in the market research study. When the system detects a consumer has entered or is likely to enter a store of interest, the system may take one or more actions including request that the consumer carry out a task. For example, in return for a monetary incentive, the consumers may be asked to go to a store of interest and, when in the store, fill out a short survey on their mobile device. The survey may include a question asking if a consumer is aware if the store they are shopping in (or recently shopped in) carries a given product and what their opinion is of that product. The survey may also include questions asking the consumer for her impressions on the shopper marketing efforts, and which products the consumer has chosen to buy and why. The consumer analytics system may also take an action that is requesting that the consumer capture some data regarding the business or a product purchased by the consumer (e.g., take a photo, record a wireless signal, record a barcode/QR code/etc.). This information collected from the consumer may be more closely related to the shopper marketing than data that may be obtained using conventional techniques, and the data may be used by a market researcher to determine an impact of the shopper marketing.

What is claimed is:

1. A method of operating a consumer analytics system in which information about one or more consumers is generated at least in part based on applying a visit detection process for identifying settings corresponding to physical locations visited by the one or more consumers to location data relating to the one or more consumers, the method comprising:
receiving input provided by a consumer identifying a setting visited by the consumer at a time;
receiving, from a mobile device operated by the consumer, a plurality of units of location data obtained by the mobile device using a Global Positioning System (GPS) receiver, an Assisted GPS receiver, or a wireless network to which the mobile device is connected, each of the plurality of units of location data indicating a respective location of the consumer;
identifying, based at least in part on the plurality of units of location data, a physical location of the consumer at the time; and
adjusting, using at least one processor and based at least in part on the input provided by the consumer and the physical location of the consumer, the visit detection process for identifying settings visited by the one or more consumers,
wherein the visit detection process comprises:
identifying an anchor using the plurality of units of location data, the anchor comprising a cluster of locations corresponding to locations indicated by at least some of the plurality of units of location data, wherein identifying the anchor comprises identifying the cluster of locations using the plurality of units of location data;
calculating a likelihood that the anchor corresponds to the setting identified in the input provided by the consumer; and
determining that the consumer visited the setting when the calculated likelihood exceeds a threshold, and
wherein adjusting the visit detection process comprises:
comparing the setting identified by the consumer in the input provided by the consumer with the physical location of the consumers;
when the setting identified by the consumer in the input provided by the consumer matches the physical location of the consumer, decreasing the threshold so that, when the decreased threshold is subsequently used as part of the visit detection process, the visit detection process is more likely to identify correctly that someone visited the setting; and
when the setting identified by the consumer in the input provided by the consumer does not match the physical location of the consumer, increasing the threshold so that, when the increased threshold is subsequently used as part of the visit detection process, the visit detection process is less likely to identify incorrectly that someone visited the setting.

2. The method of claim 1, wherein:
the visit detection process for identifying settings corresponding to physical locations comprises determining whether the physical location of the consumer corresponds to one of a plurality of settings; and
adjusting the visit detection process comprises adding, using the at least one processor, a new setting to the plurality of settings based at least in part on the input provided by the consumer.

3. The method of claim 1, wherein:
the visit detection process for identifying settings corresponding to physical locations comprises determining whether the physical location of the consumer corresponds to one of a plurality of settings; and
adjusting the visit detection process comprises removing, using the at least one processor, one of the plurality of settings based at least in part on the input provided by the consumer.

4. The method of claim 1, wherein:
the visit detection process for identifying settings corresponding to physical locations comprises determining whether the physical location of the consumer corresponds to a location of one of a plurality of settings;
each setting of the plurality of settings is associated with information defining the setting; and
adjusting the visit detection process comprises changing information identifying the setting visited by the consumer.

5. The method of claim 4, wherein:
the visit detection process for identifying settings corresponding to physical locations comprises:
comparing the physical location of the consumer to location boundaries defining an area of the setting, and
identifying that the physical location corresponds to the setting based at least in part on whether a result of the comparing indicates that the physical location of the consumer falls within the location boundaries for the setting; and
adjusting the visit detection process comprises revising the location boundaries defining the area of the setting based at least in part on the physical location.

6. The method of claim 1, wherein receiving the input provided by the consumer comprises receiving, from a data source of a social networking service, information provided by the consumer to the social networking service identifying the setting visited by the consumer.

7. The method of claim 1, further comprising:
issuing a prompt to the consumer to provide the input,
wherein receiving the input comprises receiving the input in response to the prompt.

8. At least one storage medium having encoded thereon executable instructions that, when executed by the at least one processor, cause the at least one processor to carry out a method of operating a consumer analytics system in which information about one or more consumers is generated at least in part based on applying a visit detection process for identifying settings corresponding to physical locations visited by the one or more consumers to location data relating to the one or more consumers, the method comprising:
receiving input provided by a consumer identifying a setting visited by the consumer at a time;
receiving, from a mobile device operated by the consumer, a plurality of units of location data obtained by the mobile device using a Global Positioning System (GPS) receiver, an Assisted GPS receiver, or a wireless network to which the mobile device is connected, each of the plurality of units of location data indicating a respective location of the consumer;
identifying, based at least in part on the plurality of units of location data, a physical location of the consumer at the time; and adjusting, using at least one processor and based at least in part on the input provided by the consumer and the physical location of the consumer, the visit detection process for identifying settings visited by the one or more consumers,
wherein the visit detection process comprises:
identifying an anchor using the plurality of units of location data, the anchor comprising a cluster of locations corresponding to locations indicated by at least some of the plurality of units of location data, wherein identifying the anchor comprises identifying the cluster of locations using the plurality of units of location data;
calculating a likelihood that the anchor corresponds to the setting identified in the input provided by the consumer; and
determining that the consumer visited the setting when the calculated likelihood exceeds a threshold, and
wherein adjusting the visit detection process comprises:
comparing the setting identified by the consumer in the input provided by the consumer with the physical location of the consumer;
when the setting identified by the consumer in the input provided by the consumer matches the physical location of the consumer, decreasing the threshold so that, when the decreased threshold is subsequently used as part of the visit detection process, the visit detection process is more likely to identify correctly that someone visited the setting; and
when the setting identified by the consumer in the input provided by the consumer does not match the physical location of the consumer, increasing the threshold so that, when the increased threshold is subsequently used as part of the visit detection process, the visit detection process is less likely to identify incorrectly that someone visited the setting.

9. The at least one storage medium of claim 8, wherein:
the visit detection process for identifying settings corresponding to physical locations comprises determining whether the physical location of the consumer corresponds to one of a plurality of settings; and
adjusting the visit detection process comprises adding, using the at least one processor, a new setting to the plurality of settings based at least in part on the input provided by the consumer.

10. The at least one storage medium of claim 8, wherein:
the visit detection process for identifying settings corresponding to physical locations determining whether the physical location of the consumer corresponds to one of a plurality of settings; and
adjusting the visit detection process comprises removing, using the at least one processor, one of the plurality of settings based at least in part on the input provided by the consumer.

11. The at least one storage medium of claim 8, wherein:
the visit detection process for identifying settings corresponding to physical locations comprises determining whether the physical location of the consumer corresponds to a location of one of a plurality of settings;
each setting of the plurality of settings is associated with information defining the setting; and
adjusting the visit detection process comprises changing information identifying the setting visited by the consumer.

12. The at least one storage medium of claim 11, wherein:
the visit detection process for identifying settings corresponding to physical locations comprises:
comparing the physical location of the consumer to location boundaries defining an area of the setting, and
identifying that the physical location corresponds to the setting based at least in part on whether a result of the comparing indicates that the physical location of the consumer falls within the location boundaries for the setting; and
adjusting the visit detection process comprises revising the location boundaries defining the area of the setting based at least in part on the physical location.

13. The at least one storage medium of claim 8, wherein receiving the input provided by the consumer comprises receiving, from a data source of a social networking service, information provided by the consumer to the social networking service identifying the setting visited by the consumer.

14. The at least one storage medium of claim 8, wherein the method further comprises:
issuing a prompt to the consumer to provide the input,
wherein receiving the input comprises receiving the input in response to the prompt.

15. An apparatus comprising:
at least one processor; and
at least one storage medium having encoded thereon executable instructions that, when executed by the at least one processor, cause the at least one processor to carry out a method of operating a consumer analytics system in which information about one or more consumers is generated at least in part based on applying a visit detection process for identifying settings corresponding to physical locations visited by the one or more consumers to location data relating to the one or more consumers, the method comprising:
receiving input provided by a consumer identifying a setting visited by the consumer at a time;
receiving, from a mobile device operated by the consumer, a plurality of units of location data obtained by the mobile device using a Global Positioning System (GPS) receiver, an Assisted GPS receiver, or a wireless network to which the mobile device is connected, each of the plurality of units of location data indicating a respective location of the consumer;
identifying, based at least in part on the plurality of units of location data, a physical location of the consumer at the time; and
adjusting, using at least one processor and based at least in part on the input provided by the consumer and the physical location of the consumer, the visit detection process for identifying settings visited by the one or more consumers,
wherein the visit detection process comprises:
identifying an anchor using the plurality of units of location data, the anchor comprising a cluster of locations corresponding to locations indicated by at least some of the plurality of units of location data, wherein identifying the anchor comprises identifying the cluster of locations using the plurality of units of location data;
calculating a likelihood that the anchor corresponds to the setting identified in the input provided by the consumer; and
determining that the consumer visited the setting when the calculated likelihood exceeds a threshold, and
wherein adjusting the visit detection process comprises:

comparing the setting identified by the consumer in the input provided by the consumer with the physical location of the consumer;

when the setting identified by the consumer in the input provided by the consumer matches the physical location of the consumer, decreasing the threshold so that, when the decreased threshold is subsequently used as part of the visit detection process, the visit detection process is more likely to identify correctly that someone visited the setting; and when the setting identified by the consumer in the input provided by the consumer does not match the physical location of the consumer, increasing the threshold so that, when the increased threshold is subsequently used as part of the visit detection process, the visit detection process is less likely to identify incorrectly that someone visited the setting.

16. The apparatus of claim 15, wherein:
the visit detection process for identifying settings corresponding to physical locations comprises determining whether the physical location of the consumer corresponds to one of a plurality of settings; and
adjusting the visit detection process comprises adding, using the at least one processor, a new setting to the plurality of settings based at least in part on the input provided by the consumer.

17. The apparatus of claim 15, wherein:
the visit detection process for identifying settings corresponding to physical locations comprises determining whether the physical location of the consumer corresponds to one of a plurality of settings; and adjusting the visit detection process comprises removing, using the at least one processor, one of the plurality of settings based at least in part on the input provided by the consumer.

18. The apparatus of claim 15, wherein:
the visit detection process for identifying settings corresponding to physical locations comprises determining whether the physical location of the consumer corresponds to a location of one of a plurality of settings;
each setting of the plurality of settings is associated with information defining the setting; and
adjusting the visit detection process comprises changing information identifying the setting visited by the consumer.

19. The apparatus of claim 18, wherein:
the visit detection process for identifying settings corresponding to physical locations comprises:
comparing the physical location of a consumer to location boundaries defining an area of the setting, and
identifying that the physical location corresponds to the setting based at least in part on whether a result of the comparing indicates that the physical location of the consumer falls within the location boundaries for the setting; and
adjusting the visit detection process comprises revising the location boundaries defining the area of the setting based at least in part on the physical location.

20. The method of claim 1, wherein calculating the likelihood that the anchor corresponds to the setting is performed based on prior behavior of the consumer.

* * * * *

UNITED STATES PATENT AND TRADEMARK OFFICE
CERTIFICATE OF CORRECTION

PATENT NO.        : 9,576,295 B2                                    Page 1 of 1
APPLICATION NO.   : 13/535150
DATED             : February 21, 2017
INVENTOR(S)       : Andrew Volpe et al.

It is certified that error appears in the above-identified patent and that said Letters Patent is hereby corrected as shown below:

In the Claims

Claim 1, at Column 51, Line 48, before the (;) please replace the word "consumers" with the word --consumer--

Signed and Sealed this
Third Day of July, 2018

Andrei Iancu
*Director of the United States Patent and Trademark Office*